United States Patent [19]
Gibbons et al.

[11] Patent Number: 5,846,452
[45] Date of Patent: Dec. 8, 1998

[54] LIQUID CRYSTAL OPTICAL STORAGE MEDIUM WITH GRAY SCALE

[75] Inventors: Wayne M. Gibbons, Bear, Del.; Scott T. Schnelle, Avondale, Pa.; Paul J. Shannon, Exton, Pa.; Shao-Tang Sun, Newark, Del.

[73] Assignee: Alliant Techsystems Inc., Hopkins, Minn.

[21] Appl. No.: 417,610

[22] Filed: Apr. 6, 1995

[51] Int. Cl.$^6$ .......................... C09K 19/56; G02F 1/1337
[52] U.S. Cl. ................... 252/299.4; 252/299.01; 349/123; 349/128; 349/129; 369/275.2; 428/1
[58] Field of Search ................... 252/299.01, 299.4; 428/1; 349/123, 125, 128, 129, 135; 356/363; 369/275.2

[56] References Cited

U.S. PATENT DOCUMENTS

| | | | |
|---|---|---|---|
| 4,122,027 | 10/1978 | Cole, Jr. et al. | 252/299.1 |
| 4,401,369 | 8/1983 | Jones | 252/299.1 |
| 4,565,424 | 1/1986 | Huffman et al. | 252/299.01 |
| 4,667,020 | 5/1987 | Etzbach et al. | 534/577 |
| 4,780,383 | 10/1988 | Garrett et al. | 428/1 |
| 4,886,718 | 12/1989 | Eih et al. | 252/299.6 |
| 4,892,392 | 1/1990 | Broer | 359/73 |
| 4,974,941 | 12/1990 | Gibbons et al. | 359/73 |
| 5,032,009 | 7/1991 | Gibbons et al. | 359/73 |
| 5,073,294 | 12/1991 | Shannon et al. | 252/299.01 |
| 5,097,029 | 3/1992 | Shannon | 534/577 |
| 5,202,053 | 4/1993 | Shannon | 252/299.01 |
| 5,254,655 | 10/1993 | Gibbons et al. | 528/15 |
| 5,296,321 | 3/1994 | Kawanishi et al. | 428/1 |
| 5,298,588 | 3/1994 | Gibbons et al. | 528/15 |
| 5,326,865 | 7/1994 | Grasso et al. | 534/577 |
| 5,389,285 | 2/1995 | Shannon et al. | 252/299.1 |
| 5,576,862 | 11/1996 | Sugiyama et al. | 359/75 |

FOREIGN PATENT DOCUMENTS 0632311  1/1995  European Pat. Off. ...... G02F 1/1337

OTHER PUBLICATIONS

"Novel Side–Chain Liquid Crystalline Polyester Architecture For Reversible Optical Storage" by Soren Hvilstead et al, 1995, *American Chemical Society*.

*Primary Examiner*—Shean C. Wu
*Attorney, Agent, or Firm*—Mark Goldberg

[57] ABSTRACT

An optical storage medium with gray scale capability comprising: a plurality of facing substrates in series; alignment layers disposed on one or both sides of the substrates to give alignment layer pair(s) wherein at least one of the alignment layers of each of the alignment layer pair(s) is an optical alignment layer, and wherein the optical alignment layer(s) comprise anisotropically absorbing molecules or moieties; liquid crystal layers disposed between the alignment layer pair(s); wherein, each of the liquid crystal layer(s) comprises three or more alignment regions having three or more different alignment states; and, wherein the different alignment states are controlled by exposure of optical alignment layer(s) with polarized light of a wavelength or wavelengths within the absorption band of the anisotropically absorbing molecules or moieties therein, is described. The invention is also directed to compact disc, erasable compact discs, photographic storage devices, and storage displays.

51 Claims, 8 Drawing Sheets

LIQUID CRYSTAL OPTICAL STORAGE MEDIUM WITH GRAY SCALE

BACKGROUND OF INVENTION

The present invention relates to information storage and more particularly to optical information storage.

With the expanded use of computers and audio and video systems, among others, information storage has increasingly become a problem because of the vast amounts of information which must be stored. Information storage has conventionally been achieved using a variety of means primarily involving magnetic recording means. However, the amount of information that can be stored in a given surface area is severely limited with such systems. For that reason, artisans have searched for new ways of storing information whereby space could be more efficiently utilized. Several types of optical storage devices are currently being marketed or developed. Many of the attributes of optical storage media are described in "Optical Recording" by Alan B. Marchant, Addison-Wesley (New York) 1990.

Magneto-optical materials are currently the dominate write/rewrite optical data storage media markets. This media uses magnetic fields to change the orientation of domains in magneto-optical media. The light from a laser is used to locally heat the media above its Curie temperature such that the domain can be reoriented in the magnetic field. The information is read by light since the oriented domain can change the polarization state of the incident read beam. Usually only 1-bit per domain is stored since the change in polarization is very small and, thus, it is difficult to achieve signal-to-noise ratios high enough for higher bit levels at each domain.

Compact disc (CD) and read-only memory (CD-ROM) optical storage media are the most advanced and entrenched in consumer markets. These storage media are read-only storage limited to applications where the information does not need to be changed. Emphasis is on increasing density of the media and improving the speed of the drives. By making the master disks with shorter UV light the density of CDs and CDROMs is approaching 4× the current density of about 700 megabytes. The difficulty arises in reading these higher density disks while maintaining high signal-to-noise ratios. Shorter wavelength diode lasers (430 nm–680 nm) for reading the disks are being developed to access the higher density media.

One method being used to acquire more storage without increasing the bit density on the disks is to stack multiple disks and access each disk by changing the focal position of the read beam. This technology has been demonstrated with two music CDs separated by an air gap of approximately 100 microns.

Write-once read-many times compact disc (CD-R) technology has a few commercially available media and systems. The desire here is to achieve backward compatibility with CD and CDROM systems. Storage materials based on dye-doped polymers are the typical medium. To maintain backward compatibility, the dye/polymers are spun onto metallic layers. A high intensity laser pulse permanently changes the refractive and absorptive properties of the dye/polymer layer which results in a reflectivity change of the media.

Ablative write once-read many times (WORM) technologies typically are used in large archival systems. With this technology high power gas lasers are used to ablate pits in metal layers. This brute force technique is very robust and well established in large archival systems but is unsuitable for CD and CDROM applications with low power IR lasers.

An erasable optical storage medium with write/rewrite capability (CD-E) currently uses magneto-optical media and drives but requires the presence of magnetic and optical fields to write the information and, thus, is not suitable for compact disc applications. Another erasable optical storage medium uses short high intensity optical pulses from the diode lasers change the phase of these materials from a crystalline to amorphous state. The amorphous state is less reflective (R~28% vs. 70% of the crystalline phase) and serves as a "pit". Longer medium intensity pulses are used to return the amorphous material back to the crystalline state. The wavelength of the laser diodes is approximately 680 nm. Up to one hundred write-read-erase cycles have been reported for these media.

There has been considerable interest in the optical alignment of liquid crystals for optical information storage. For instance, U.S. Pat. No. 5,296,321 describes a photorecording medium based on a transparent substrate, a photochromic layer and a liquid crystal layer capable of reversibly changing orientation upon exposure to light. The medium can only achieve two states of alignment, homogeneous and homeotropic (parallel and perpendicular to the substrate). U.S. Pat. No. 4,780,383 describes an optical storage medium having expanded capacity based on the selective reflection of various wavelengths of light of a cholesteric polymer phase. The medium requires simultaneous control of alignment, careful tuning of temperature and a polymerization process to achieve a multiplicity of distinguishable states.

U.S. Pat. No. 4,886,718 describes a device for reversible optical information storage, using polymeric liquid crystals as the storage medium, comprised of a film of a liquid crystal main chain polymer. The optical information is stored by using a laser beam to produce a selective variation of the spatial ordering and/or orientation of the liquid crystal main chain polymer. The medium can act as a binary information storage device by creating scattering centers with a write beam. The medium also can be written with a polarized laser light to induce local modulations in refractive index thus producing various degrees of reorientation, which corresponds to continuous phase modulation. This affords the opportunity for analog storage of data. Holographic methods are used for storing data. Information to be stored may comprise pictorially representable structures, such as objects or two-dimensional images, or printed pages.

The primary disadvantage of using a liquid crystalline polymer as an optical storage medium is the high viscosity of the medium. Initial orientation of the medium requires elevated temperature, external fields, long annealing times or some combination of these processes. In addition the response of the medium to the writing light beam is low and often requires external heating.

Although these optical storage systems offer advantages over other conventional recording systems, for the reasons mentioned, they are not entirely satisfactory. It would be useful to have a practical and inexpensive optical storage medium that had such a multiplicity of distinguishable states that gray scale capability was available. Besides storing digital information, such a medium would be useful to record and store photographic images for instance. If the medium also had rewrite capability, such a medium would constitute an optical storage display. It also would be useful to have an optical storage medium that was layered to provide several levels of information, thus, increasing the overall density of information in the medium.

A practical optical storage medium having a multiplicity of distinguishable states, gray scale capability and the ability to be layered to increase the overall density of information has been discovered and is herein disclosed.

Accordingly, one objective of the present invention is to provide a medium whereby multiple states of information (i.e., more than one binary digit) may be recorded in a single domain.

Another objective of the present invention is to provide a medium which has the capability for gray scale and storing a photographic image.

Another objective of the present invention is to provide a multi-layered optical storage medium, each layer capable of storing information with gray scale.

Another objective of the present invention is to provide an optical storage medium that can be addressed to provide an optical storage display.

Other objectives of the present invention are to provide optical storage mediums for compact discs with read only capabilities, compact discs with write once-read many times capability, and erasable compact discs with write-rewrite capability.

These and other advantages of the present invention will become apparent from the detailed description of preferred embodiments which follows.

SUMMARY OF INVENTION

Accordingly, the invention is an optical storage medium with gray scale capability comprising: a plurality of facing substrates in series having one or more pairs of facing surfaces; alignment layers disposed on said pair(s) of facing surfaces to give alignment layer pair(s) wherein at least one of the alignment layers of each of said alignment layer pair(s) is an optical alignment layer, and wherein the optical alignment layer(s) comprise anisotropically absorbing molecules or moieties; liquid crystal layer(s) disposed between said alignment layer pair(s), wherein, each of said liquid crystal layer(s) comprises three or more alignment regions having three or more different alignment states, and wherein the different alignment states are controlled by exposure of said optical alignment layer(s) with polarized light of a wavelength or wavelengths within the absorption band of the anisotropically absorbing molecules or moieties therein. The invention is also directed to specific optical storage devices and a storage display.

DETAILED DESCRIPTION

Figure 1:
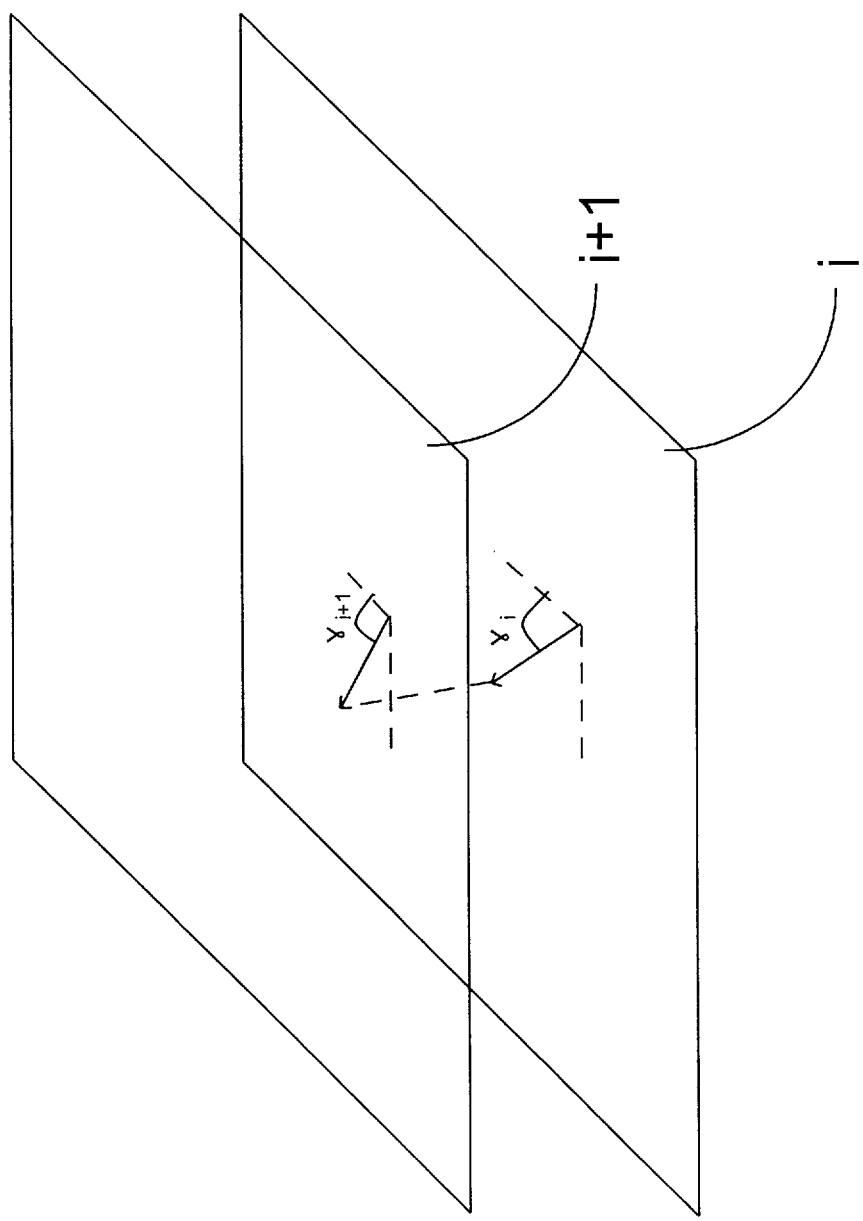
FIG. 1 illustrates the variation in director angle between plane i and i+1 for a twisted alignment state.

U.S. Pat. Nos. 5,032,009, "Process for Aligning Liquid Crystal Media" and 5,073,294, "Process for Preparing Compositions Having Multiple Oriented Mesogens" are hereby incorporated by reference.

By "substrate" we mean the supporting structure for the alignment layer. A substrate can be any solid combination of layered materials that provide a useful function for the final optical storage medium. For example, the substrate can be any combination of the following materials: crystalline or amorphous silicon, glass, plastic, including polyester, polyethylene and polyimide; quartz, indium-tin-oxide, gold, silver, silicon dioxide, polyimide, silicon monoxide, anti-reflective coatings, color filter layers, polarizers and phase compensating films. In practice, some of these materials are deposited or coated onto a basic supporting structure such as glass or plastic.

"Liquid crystal" refers to molecules with anisotropic geometry, such as rod-shaped or disc-shaped, that exhibit stable states intermediate between liquid and solid, and which have low molecular weights, i.e., less than about 1500, and preferably less than 1000. Useful liquid crystals for the invention described herein include all those described in U.S. Pat. No. 5,032,009; new superfluorinated liquid crystals exemplified by ZLI-5079, ZLI-5080, ZLI-5081, ZLI-5092, MLC-2016, MLC-2019, and MLC-6043 available from EM Industries, Hawthorne N.Y. Also useful are guest-host formulations prepared with all types of liquid crystals and anisotropically absorbing dyes as described in U.S. Pat. No. 5,032,009. Preferred liquid crystals for this invention are nematic liquid crystals and guest-host mixtures comprising nematic liquid crystals and anisotropically absorbing dyes.

Anisotropically absorbing dyes preferred in preparation of guest-host mixtures are the dichroic arylazo, di(arylazo), tri(arylazo), tetra(arylazo), penta(arylazo), anthraquinone, mericyanine, methine, 2-phenylazothiazole, 2-phenylazobenzthiazole, stilbene, 1,4-bis(2-phenylethenyl) benzene, 4,4'-bis(arylazo)stilbenes, perylene and 4,8-diamino-1,5-napthoquinone dyes. Other useful anisotropically absorbing dyes are the liquid crystal coupled dichroic dyes described in U.S. Pat. No. 5,389,285. Arylazo, poly (arylazo), and stilbene dichroic dyes are most preferred for the preparation of guest-host mixtures.

The most preferred liquid crystals are the 4-cyano-4'-alkylbiphenyls and 4-alkyl-(4'-cyanophenyl)cyclohexanes and guest-host mixtures derived from them. The guest-host mixtures are especially preferred for optical storage media that require optical absorptive properties for applications in erasable optical storage media (CD-E).

Other useful liquid crystals for this invention include the polymerizable liquid crystals as described in U.S. Pat. No. 5,073,294; and the liquid crystal difunctional methacrylate and acrylate monomers as described in U.S. Pat. No. 4,892,392.

Preferred polymerizable liquid crystals useful in this invention are the polymerizable nematic monomer compositions comprising (A) 20 to 80 wt % of at least one monomer having the general formula (I) wherein n is 10, 12, or 14, and (B) 80 to 20 wt % of at least one monomer having the general formula (I) wherein n is 4, 6 or 8:

$$\text{R}-\underset{\text{CH}_2}{\overset{\parallel}{\text{C}}}-\overset{\text{O}}{\overset{\parallel}{\text{C}}}-\text{O}-(\text{CH}_2)_n-\text{O}-\!\!\!\bigcirc\!\!\!-\text{Y}-\!\!\!\bigcirc\!\!\!-\text{CN} \qquad (\text{I})$$

|    | R    | n  | Y       |
|----|------|----|---------|
| Ia | CH$_3$ | 10 | —CO$_2$— |
| Ib | CH$_3$ | 6  | —CO$_2$— | wherein R is CH$_3$ or H and Y is covalent bond or —CO$_2$—. The synthesis and formulation of these nematic monomer compositions are described in U.S. Pat. No. 5,202,053. Specific nematic monomers used in examples herein are Ia and Ib.

Other preferred polymerizable liquid crystal compositions are the polymerizable nematic monomer compositions of I disclosed above, combined with 0.1 to 30 wt % of the difunctional methacrylate and acrylate monomers II:

$$\text{R}-\underset{\text{CH}_2}{\overset{\parallel}{\text{C}}}-\overset{\text{O}}{\overset{\parallel}{\text{C}}}-\text{O}(\text{CH}_2)_p\text{O}-\!\!\!\bigcirc\!\!\!-\overset{\text{O}}{\overset{\parallel}{\text{C}}}-\text{O}-\!\!\!\bigcirc\!\!\!\overset{\text{R}_1}{\underset{\text{O}}{}}-\overset{\text{O}}{\overset{\parallel}{\text{C}}}-\!\!\!\bigcirc\!\!\!-\text{O}(\text{CH}_2)_p\text{O}-\overset{\text{O}}{\overset{\parallel}{\text{C}}}-\underset{\text{H}_2\text{C}}{\overset{\parallel}{\text{C}}}-\text{R} \qquad (\text{II})$$

|     | R    | R$_1$  | p |
|-----|------|------|---|
| IIa | CH$_3$ | CH$_3$ | 6 |
| IIb | CH$_3$ | H    | 6 | wherein R is CH$_3$ or H, R$_1$ is CH$_3$, H, Cl, OCH$_3$ and p=1–12. The synthesis of these monomers is described by Broer et al, in U.S. Pat. No. 4,892,392 and a specific example of the synthesis of IIb is described in U.S. Pat. No. 5,073,294 incorporated by reference. The difunctional monomer IIa is used in examples herein.

The polymerizable nematic compositions are combined with small amounts of photoinitiator, preferably 0.5 to 2.0 wt %, to enhance the reactivity of the composition toward actinic radiation. Examples of photoinitiators which are useful are benzophenone and 2,2-dimethoxy-2-phenylacetophenone. Multifunctional monomers, useful as crosslinking agents, can be added to the liquid crystal compositions at levels of about 0.1 to 5 wt %. Polymerization inhibitors, such as methylhydroquinone, can also be added at levels of about 0.05 to 0.1 wt %, to inhibit premature polymerization of the liquid crystal phase.

The polymerizable compositions, when melted, exhibit nematic mesophases when cooled to near room temperature. The mesophases behave very similarly to conventional nematic liquid crystals. Thus, they respond to surface alignment forces in the same manner as conventional liquid crystals. However, when they are exposed to actinic radiation, notably UV radiation from a black light or 200 W Hg arc, the liquid crystal medium undergoes rapid polymerization to freeze-in the alignment of the liquid crystal phase in a polymer matrix. Thus, in this invention, polymerizable liquid crystals are preferred for optical storage mediums such as CD, CDROM and WORM, wherein the artisan wishes to permanently store information.

Herein the term "alignment layer" is the layer of material on the surface of a substrate that controls the alignment of the liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

"Optical alignment layer" herein refers to an alignment layer that contains anisotropically absorbing molecules or moieties that will align liquid crystals after exposure with polarized light. Optical alignment layers may be processed via conventional means, such as mechanical rubbing, prior to or after exposure to polarized light. The anisotropically absorbing molecules or moieties of the optical alignment layers exhibit absorption properties with different values when measured along axes in different directions. The anisotropic absorbing molecules or moieties exhibit absorption bands between 150 nm and about 2000 nm. The anisotropically absorbing molecules or moieties of the optical alignment layer can be covalently bonded within a main chain polymer, they can be covalently bonded as side groups to a main polymer chain, they can be present as nonbonded solutes in a polymer, they can be in the adjacent liquid crystal layer as a solute and adsorbed on the surface of a normal alignment layer to give an optical alignment layer, they can be covalently bonded or directly adsorbed onto a substrate or an alignment layer to give an optical alignment layer.

Preferred optical alignment layers have absorbance maxima between 150 and about 1600 nm. More preferable optical alignment layers have absorbance maxima between 150 nm and about 800 nm. Most preferable optical alignment layers have absorbance maxima between 150 and 400 nm or between 400 nm and 800 nm.

Preferably, the optical storage medium of this invention has two or more optical alignment layers that have absorbance maxima between 150 and 1600 nm, differ by more than 10 nm, and more preferably differ by more than 50 nm. More preferably, the absorbance maxima of the optical alignment layers are between 150 and 800 nm, differ by more than 10 nm, and preferably differ by more than 50 nm. Most preferably the absorbance maxima of the optical alignment layers are between 150 and 400 or between 400 and 800 nm and differ by more than 10 nm, and preferably differ by more than 50 nm. This difference in absorbance between optical alignment layers allows each liquid crystal layer to be addressed selectively by the proper choice of wavelength of polarized light.

Preferred optical alignment layers have anisotropically absorbing molecules or moieties present as nonbonded solutes dissolved in a polymer matrix carrier. These are referred to as guest-host optical alignment layers. They are prepared by coating on substrates a thin layer of organic material containing the anisotropically absorbing molecules or moieties. Typically the anisotropically absorbing molecules are dissolved in solution along with a polymeric material. The solution is then coated on substrates using, typically, a spin casting technique. The coatings are then oven baked to remove residual solvent and perform the final cure.

Among the polymers useful in preparing guest-host optical alignment layers are poly(methyl methacrylate), poly(amide-6,6), poly(styrene), poly(vinyl alcohol), epoxy-amine polymers and polyimides. Preferred polymers for optical alignment layers are polyimide polymers. The preparation of polyimides is described in "Polyimides", D. Wilson, H. D. Stenzenberger, and P. M. Hergenrother Eds., Chapman and Hall, New York (1990). Specific polyimides useful in preparation of optical alignment layers are the condensation product of 3,4,3',4'-benzophenone dianhydride and oxy(4,4'-dianiline); SPI 2000 polyimide available from MicroSi, Inc., Phoenix, Ariz. 85044; and NISSAN 7311 and 7210 polyimides available from Brewer Science, Rolla, Mo.

Alternatively, anisotropically absorbing molecules can be covalently bonded to polymers. For instance, poly(amic acid)s, which are precursors to polyimides, can be prepared with anisotropic absorbing materials covalently bonded into the poly(amic acid) polymer chain. This typically is accomplished by mixing of dianhydride and diamines, including the anisotropically absorbing molecules as one of the two reactive components, and allowing the materials to polymerize in a solvent such as N-methylpyrolidone or tetrahydrofuran. The prepolymer solution is then coated on substrates and oven baked to give the final polyimide optical alignment layers.

Alternatively and preferably, optical alignment layers are prepared by coating conventional alignment layers such as polyimide on the substrates. The anisotropically absorbing molecules are dissolved in a liquid crystal medium to give a guest-host mixture. When the guest-host mixture is allowed to contact the conventional alignment layer the anisotropically absorbing molecules are adsorbed on the surface and an optical alignment layer is formed. Optical alignment layers prepared by this method are preferred for optical storage media that require optical absorptive properties for applications in erasable optical storage media (CD-E).

Alternatively, optical alignment layers are prepared by coating conventional alignment layers such as polyimide on the substrates and anisotropically absorbing molecules are dissolved in a solvent. When the solution is coated on the conventional alignment layer the anisotropically absorbing molecules are adsorbed on the surface and an optical alignment layer is formed.

Alternatively, optical alignment layers are prepared by coating solutions of anisotropically absorbing molecules directly on substrates. The anisotropically absorbing molecules are adsorbed to the substrate to form a thin layer or they can be covalently bonded to the substrate.

Anisotropically absorbing molecules or moieties preferred in preparation of optical alignment layers for optical storage media are the dichroic arylazo, di(arylazo), tri(arylazo), tetra(arylazo), penta(arylazo), anthraquinone, mericyanine, methine, 2-phenylazothiazole, 2-phenylazobenzthiazole, stilbene, 1,4-bis(2-phenylethenyl)benzene, 4,4'-bis(arylazo)stilbenes, perylene and 4,8-diamino-1,5-napthoquinone dyes. Other useful anisotropically absorbing materials are the liquid crystal coupled dichroic dyes described in U.S. Pat. No. 5,389,285.

Preparation of the anisotropically absorbing materials listed above are well known as shown, e.g., by Huffman et al, in U.S. Pat. No. 4,565,424, Jones et al, in U.S. Pat. No. 4,401,369, Cole, Jr. et al. in U.S. Pat. No. 4,122,027, Etzbach et al, in U.S. Pat. No. 4,667,020, and Shannon et al, in U.S. Pat. No. 5,389,285.

Preferred anisotropically absorbing molecules and moieties for all types of optical alignment layers are arylazo, poly(arylazo), and stilbene dyes. Liquid crystal coupled dyes are preferred for guest-host optical alignment layers or for liquid crystals guest-host mixtures used in preparing optical alignment layers. Arylazo and stilbene dyes are the most preferred dyes for optical alignment layers having absorbance maxima between 150 and 400 nm. Poly(arylazo) dyes are most preferred for optical alignment layers having absorbance maxima between 400 and 800 nm. A most preferred poly(azo) dye is diazodiamine 1; a most preferred stilbene dye is 4,4'-diaminostilbene, 2; and a most preferred arylazo dye is monoazodiamine 3 (see Table 1). The preparation of the dye 1 is described in U.S. Pat. No. 5,389,285; synthesis of dye 3 is described in the examples; and 4,4'-diaminostilbene is commercially available from Aldrich Chemical Co., Milwaukee, Wis.

"Alignment layer pairs" herein refer to two alignment layers that control the alignment of the same liquid crystal layer.

"Alignment region" refers to a continuous area of a liquid crystal layer that has the same alignment state. The alignment region can be between 0.01 and $10^6$ $\mu m^2$ ($\mu m$ equals micrometer). Preferred alignment regions range in size from 0.1 to $10^6$ $\mu m^2$. Most preferred alignment regions range in size from 0.1 to 100 $\mu m^2$. In the liquid crystal technology, alignment regions as defined herein are often referred to as "domains". However, in information storage technology a domain is used to describe any uniform area (bubble, colored spot, reflective surface, etc.) that defines an information bit. Herein alignment region will be used as defined above and domain will be used to describe uniform areas in storage media other than liquid crystal media.

TABLE 1

| Dye # | Structure |
|---|---|
| 1 | $H_2N$—⟨⟩—N=N—⟨⟩—N=N—⟨⟩—$NH_2$, with $OCH_3$ and $H_3C$, $H_3C$ substituents |
| 2 | $H_2N$—⟨⟩—CH=CH—⟨⟩—$NH_2$ |
| 3 | $H_2N$—⟨⟩—N=N—⟨⟩—$NH_2$, with $OCH_3$ and $H_3C$ substituents |

The "direction of the local alignment" of the liquid crystal layer is the average direction of an ensemble of mesogens projected into the plane of the alignment layers.

"Alignment states" refer to three distinct types of alignment: birefringent alignment, twist alignment, and combination alignment. Each type of alignment possesses the capability for three or more discreet, distinguishable states. Each alignment region within a liquid crystal layer of this invention takes on a type of alignment and a discreet alignment state. All alignment regions do not have to possess unique alignment states. The same alignment state may occur many times in different alignment regions throughout a liquid crystal layer.

By a "twist alignment state" is meant the alignment regions differ by a change in twist. By "twist" or "twisted alignment" is meant that the direction of the local alignment of the liquid crystal layer between an alignment layer pair varies in a continuous fashion from one alignment layer to the other. As illustrated in FIG. 1, the projected director angle in the plane of alignment layer i, $\gamma_i$, is different from the projected director angle in the plane of alignment layer i+1, $\gamma_{i+1}$, and, as a result, the local liquid crystal projected director continuously changes from $\gamma_i$ to $\gamma_{i+1}$ creating a twist structure in the liquid crystal layer. For this invention, the twist angle, $\gamma_t = \gamma_{i+1} - \gamma_i$, can vary from −360 degrees to 360 degrees. To get greater than a 90° or less than a −90° twist angle, a chiral dopant such as CB-15 (EM Chemicals, Hawthorne N.Y.) is incorporated.

When the twist angle, $\gamma_t$, is equal to zero, there is no twist in the liquid crystal medium and the medium is said to be parallel aligned. Most liquid crystal display applications currently use $\gamma_t$ equal to 90 or −90 degrees.

Figure 2:
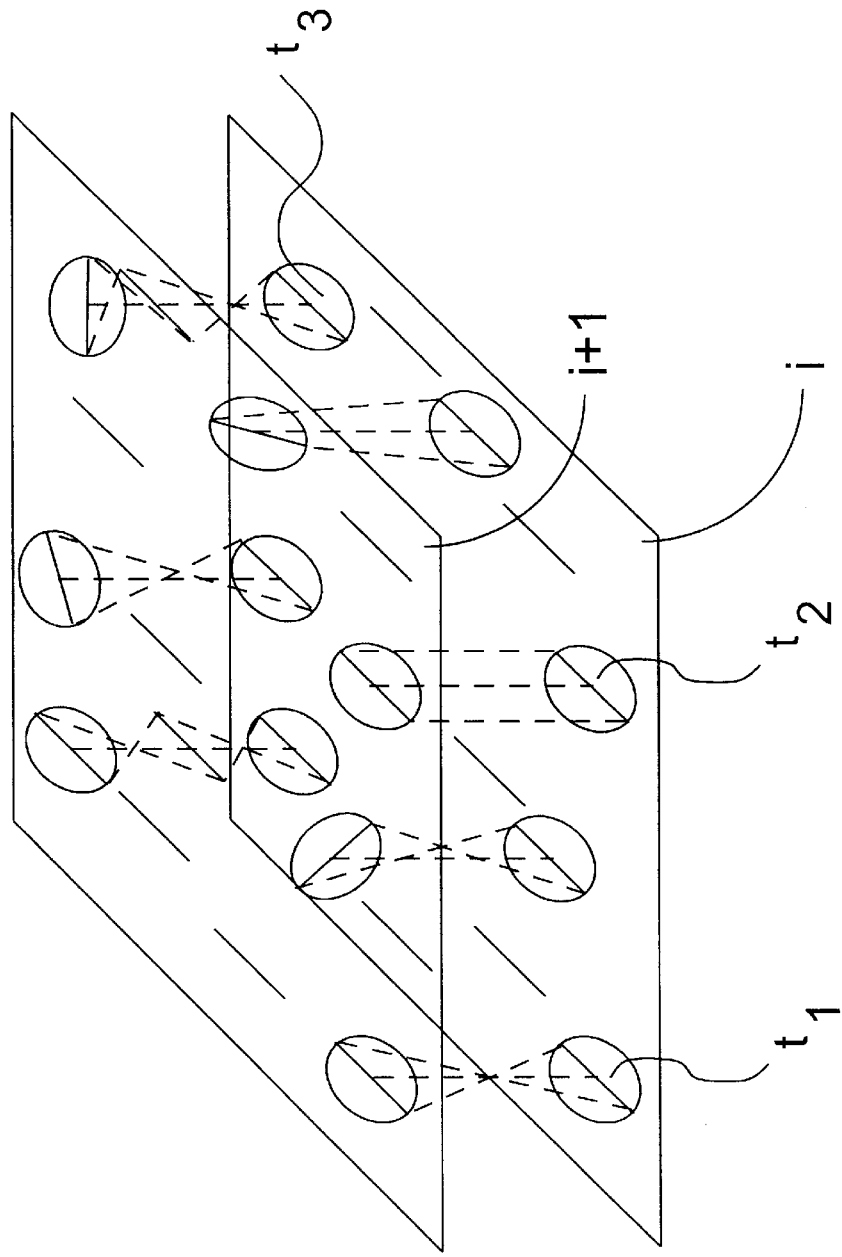
FIG. 2 illustrates several alignment regions with various twisted alignment states in a liquid crystal layer of this invention.

In a twisted alignment state each alignment region can have a twist other than zero and the twist value varies from region to region. It is further stipulated that the projection of the local liquid crystal director onto one alignment layer is in the same direction for all domains at that alignment layer, whereas the projection of the local liquid crystal director on the second alignment layer varies in direction for each alignment region to create the variation in twist value. FIG. 2 illustrates a liquid crystal layer having several alignment regions with variations in twist value. The solid lines within each alignment region at the planes i and i+1 indicate the director of the liquid crystal at that plane. The dashed lines indicate how the director rotates in proceeding from one plane to the other. For instance region $t_1$ has a 180° twist value, $t_2$ has a 0° twist value and $t_3$ has a 270° twist value.

Figure 3:
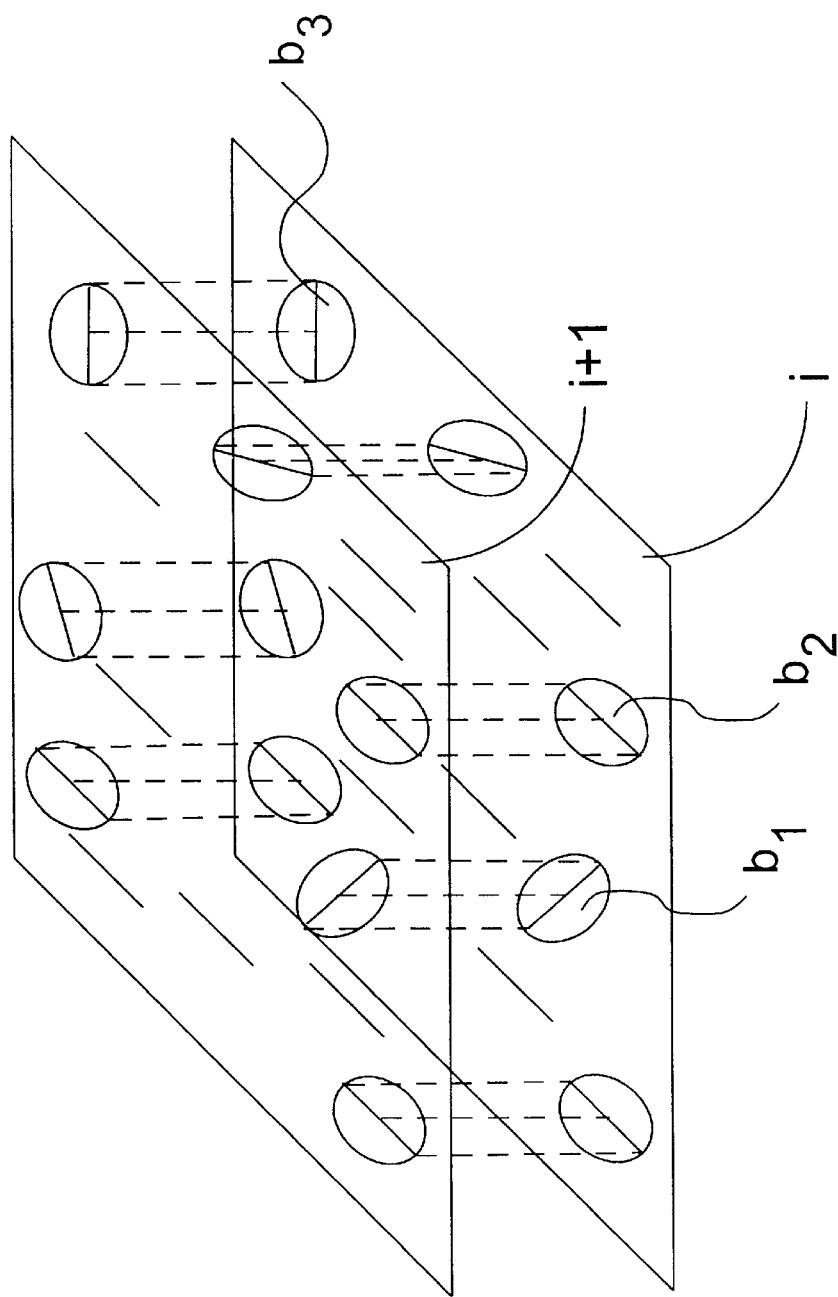
FIG. 3 illustrates several alignment regions with various birefringent alignment states in a liquid crystal layer of this invention.

By a "birefringent alignment state" is meant the alignment regions in a liquid crystal layer differ by a change in birefringence. Each alignment region has zero twist ($\gamma_t=0$ degrees) but the projection of the liquid crystal director onto the alignment layer varies in direction for each alignment region. A liquid crystal layer with several birefringent alignment states is illustrated in FIG. 3. Alignment regions $b_1$, $b_2$ and $b_3$ have various directors of the local alignment relative to the background alignment in plane i, 60°, 0° and 90°, respectively.

Figure 4:
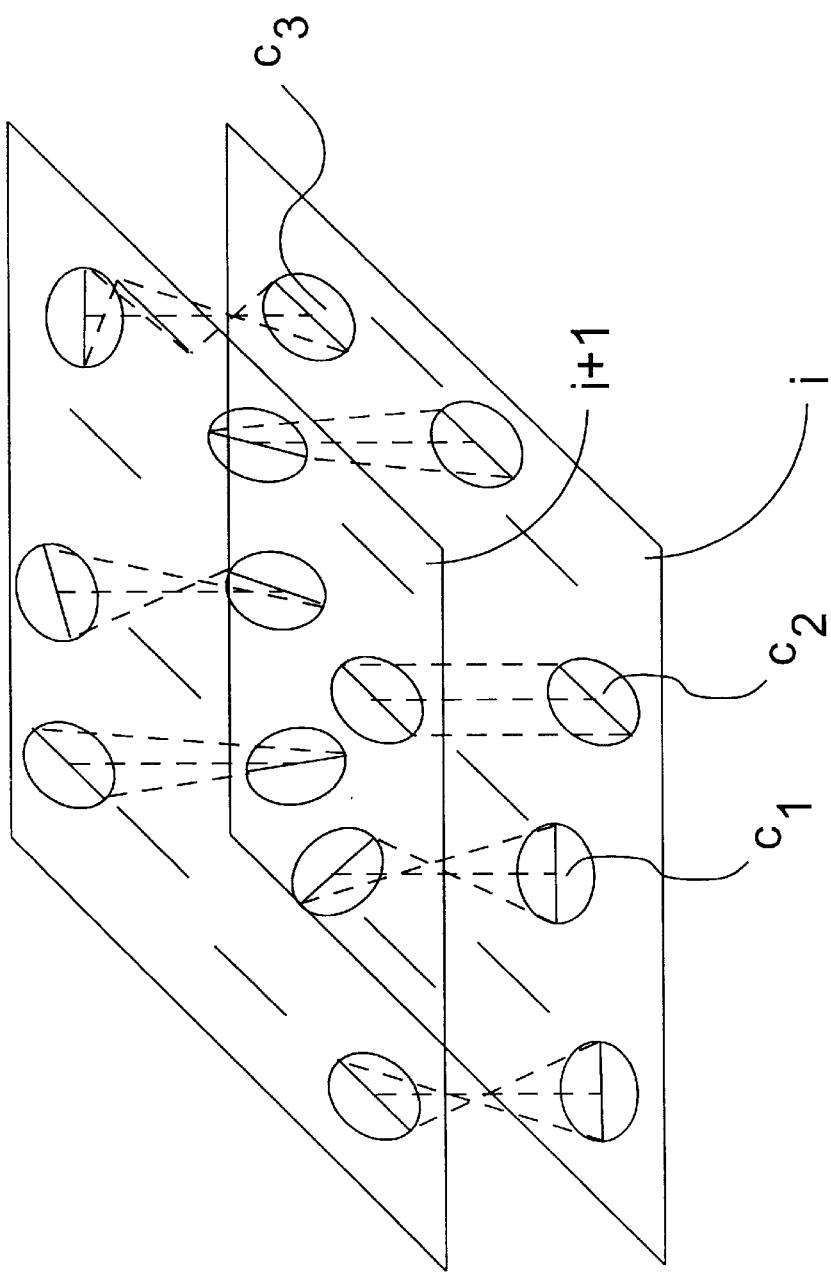
FIG. 4 illustrates several alignment regions with various combination alignment states in a liquid crystal layer of this invention.

By a "combination alignment state" is meant that one or more alignment region in the liquid crystal layer differs by a change in twist and birefringence. Thus, for each alignment region, the twist can vary in magnitude and the projection of the local liquid crystal director onto each alignment layer can vary in direction. FIG. 4 illustrates a liquid crystal alignment layer with several alignment regions with different combination alignment states. The projection of the local liquid crystal director onto both alignment layers may be different. Alignment regions $c_1$, $c_2$ and $c_3$ all have different twist values and different directors of the local alignment. For instance, $c_1$ has a 45° twist and a 90° change in director relative to the background alignment of i; $c_2$ has a 0° twist and a 0° change in director; and $c_3$ has a 270° twist and a 0° change in director.

By "grayscale" is meant that each domain in the optical storage medium can be encoded with three or more values. For example, if each domain can be encoded with N possible values (where N is an integer), then each domain must have N distinct states that are measured by the detection system suitable for the particular application. The size of N is determined by the sensitivity of the optical storage medium and/or the sensitivity of the detection system.

Traditionally, the N possible values are represented as a power of two. If there are N=16 possible values, the 16 values (thus 16 distinct states for each domain in the media) would be represented as $2^4$ and called 4 bit grayscale. The term bit represents the power of two required to get the total possible values. For example, 0 bit would represent 1 possible encoded value, 1 bit=2 possible encoded values, . . . j bit=$2^j$ possible encoded values.

In most applications of optical storage media, the distinct states of each domain cause a variation in the transmitted or reflected flux of light incident onto a light sensitive detector. For each distinct state there is a distinct light level transmitted or reflected. Solid state detectors based on semiconductors, and the human eye are a few examples of light sensitive detectors. Each detection system must process the transmitted or reflected light signals into information useful for interpretation.

In the case of solid state detectors, electronic processing converts the light flux level to a binary number (power of two) that is interpreted by a computer. The computer processes the binary number from each domain either serially (one domain at a time) or in parallel (multiple domains at a time) and derives the information it needs to perform the programmed task.

In the case of the human eye, the distinct light levels for each domain are processed in parallel by the brain to create a photographic image. Each domain by itself is not very meaningful to the brain but the sum total of all the transmitted or reflected light levels from each domain result in meaningful information that is interpreted by the brain.

Most optical storage mediums demonstrate only one bit of information can be recorded in a single domain. As a consequence, only two distinct states are possible (i.e., a 0 or 1 in a binary number system). Therefore, to store the number 16 in this medium, four domains would be needed. However, if each domain had 16 distinct states then a single domain could be used to store the same number that required four domains in the 1 bit medium. Thus, we have effectively increased the storage density by four times. Carrying this argument to its logical conclusion, if $2^k$ detectable states were available for each domain, the storage density of the medium would increase by k times.

In the context of the present invention, each liquid crystal alignment region in the optical storage medium can be encoded with a distinct birefringent alignment state, twist alignment state, or a combination alignment state. If polarized light is transmitted or reflected through the medium and then passed through a polarizer the distinct alignment state would change the light level detected. For example, if we use the twist alignment state for each alignment region, there is a distinct light level detected for twist alignment states with their twist value limited to one quadrant (0 to 90 degrees, 90 to 180 degrees, etc.) of a full 360 degree twist. For one quadrant and N distinct twist alignment states, there are 90/N possible light levels to be detected. Therefore each alignment region in the medium of the present invention is capable of grayscale. Similar arguments can be made for the birefringent and combination alignment states used in the present invention.

To obtain the desirable features of gray scale in a medium, greater than two alignment states are required. A preferred optical storage medium of the invention described herein has between 4 and 2000 alignment states.

Figure 5:
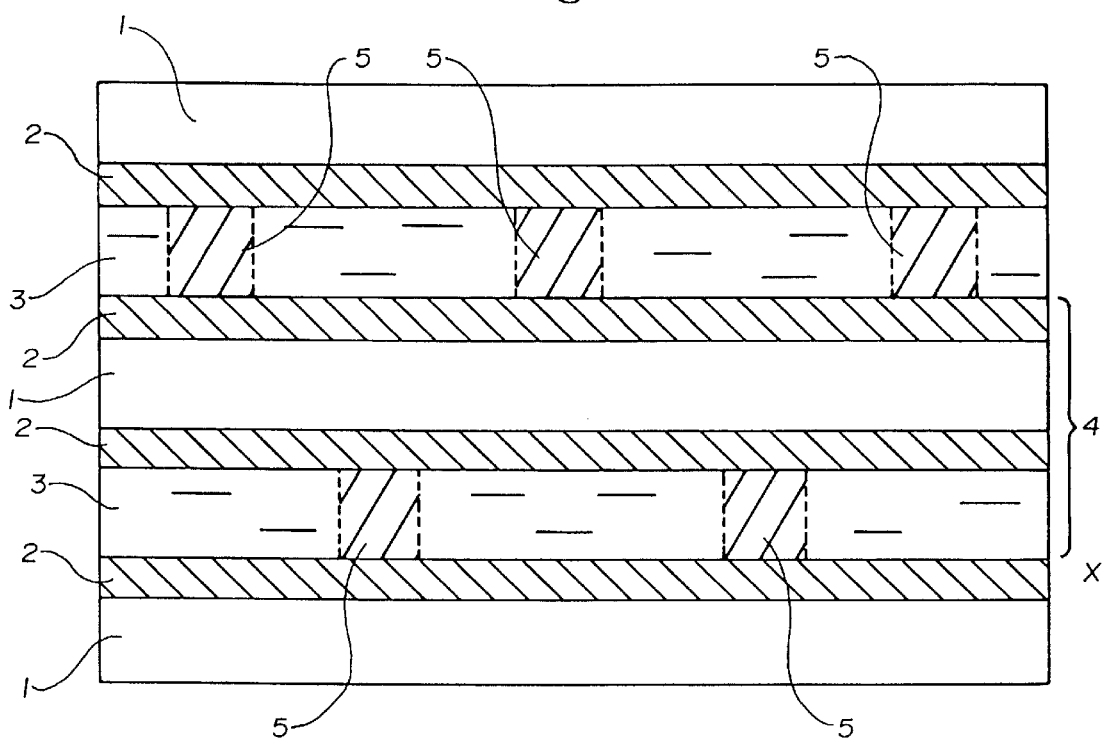
FIG. 5 is a cross section illustrating the basic construction of an optical storage medium of this invention.

One embodiment of the present invention will be described in detail below with reference to the accompanying drawings. FIG. 5 is a cross section illustrating the basic construction of an optical storage medium of this invention. A series of substrates 1 are coated with alignment layers 2 on one or both sides. The coated substrates are then stacked in series and spaced appropriately with spacers (not shown). The series of substrates may be sealed at the perimeter (not shown), except for fill and exit ports, with a sealing compound to make a cell. The cell is then filled with a desired liquid crystal to provide liquid crystal layers 3, followed by sealing the fill and exit ports. Each additional dual coated substrate in the series allows for a repetition 4 comprising an additional liquid crystal layer. Repetitions may number from X=0 to about 20 and are only limited by the capability to address each liquid crystal layer.

Spacing of the substrates can be accomplished by the use of particulate spacers. Spacers are inert particles whose physical size, in at least one dimension, match those of the desired cell thickness. Glass fiber rods (EM Industries, Inc., Hawthorne, N.Y.), rubber and polystyrene latex spheres, evaporated or sputtered films are available as spacers. The spacers act to physically control the cell gap by allowing the substrates to come into direct contact with the spacer particles and thereby hold the substrates apart. The spacers can be lightly and uniformly scattered over the entire area comprising the display prior to bringing the substrates together alternatively spacers can be incorporated into an adhesive and applied only in the gasket seam formed by the sealing compound. An additional mechanism used to control spacing is the placement of thin film gaskets of well defined thicknesses at the cell perimeter. Well characterized polymer thin films such as Mylar or Teflon (Du Pont Co., Wilmington, Del.) as well as aluminum films can be used for this purpose.

Sealing of the substrates can be accomplished by the use of curable adhesives which are applied at the cell perimeter and are allowed to capillary fill any openings or voids prior to curing. Quik-Stik epoxy resin (GC Electronics, Rockford, Ill.) as well as Norland Optical Adhesives (Norland Products Inc., New Brunswick, N.J.) are available for this purpose. In the case of large area flexible displays utilizing thermoplastic polymeric substrates, heat sealing can be used, where by the various substrates can be welded together by the application of heat and pressure.

As can be seen from FIG. 5 each liquid crystal layer has a corresponding alignment layer pair that control the alignment of the liquid crystal layer. In this invention at least one of the alignment layers of each alignment layer pair is an optical alignment layer. Different alignment regions 5 of the liquid crystal layer have three or more alignment states that result in gray-scale. In FIG. 5 the specific alignment states of the alignment regions 5 may be different twisted, birefringent, or combination alignment states, or a mixture of all three types of states, illustrated in FIGS. 2–4. The alignment states are controlled by exposure of selected regions of the optical alignment layer with polarized light. Each liquid crystal layer can be selectively addressed by matching the absorption characteristics of the corresponding optical alignment layer with the appropriate wavelength of polarized light. Exposure of the optical alignment layer with polarized light can be accomplished before or after construction of the cell and before or after contact with the liquid crystal medium.

To achieve an optical storage medium exhibiting gray scale an optical process is required for storing information with gray scale in a liquid crystal layer. The process comprises: a) exposing, in selected alignment regions, one or two optical alignment layers of an alignment layer pair to polarized light having a vector, wherein the optical alignment layer(s) comprise anisotropically absorbing molecules or moieties and the polarized light is of a wavelength or wavelengths within the absorption band of the anisotropically absorbing molecules or moieties; and wherein the exposed optical alignment layer(s) induce alignment of a liquid crystal medium at an angle + and $-\theta$ with respect to the vector of the polarized light and along the plane of the optical alignment layer(s); b) rotating the vector of the polarized light in the plane of the optical alignment layer(s) to a new position; c) repeating step a. Each exposure with a new vector of the polarized light establishes another alignment state within the liquid crystal layer.

Exposure of selected regions of one optical alignment layer, of an alignment layer pair, to polarized light while the other alignment layer remains fixed allows formation of twisted alignment states.

Equal exposure of selected regions of two optical alignment layers, of an alignment layer pair, to polarized light gives a birefringent alignment state.

When selected regions of two optical alignment layers of an alignment layer pair are differently exposed to polarized light, a combination alignment state is created.

By "polarized light" we mean light that is elliptically polarized such that the light is more polarized along one axis (referred to as the major axis) versus the orthogonal axis (referred to as the minor axis). For this invention, the preferred polarization is linearly polarized light where the light is polarized mostly along one axis (the major axis) with little or no polarization component along the minor axis. In this invention the polarized light has one or more wavelengths between 150–2000 nm and preferably is between 150 and about 1600 nm and more preferably between 150 nm and about 800 nm. Most preferably the polarized light is between 150 and about 400 nm or between 400 nm and 800 nm. A preferred source of light is a laser, e.g., an argon, helium neon, or helium cadmium. Other preferred sources of light are mercury arc, xenon lamps and black lights. With lower power lasers or when aligning small alignment regions, it may be necessary to focus the light beam onto the optical alignment layer.

The process can be used to create a very large number of distinct alignment states in a liquid crystal medium to achieve a high resolution of gray scale. A preferred number of alignment states is between 4 and 2000, and most preferred are between 16 and 360. This latter number of states allows high resolution photographic images to be stored in the medium. The process also allows a very high density of alignment regions per unit area. Preferred alignment regions are in the range of 0.1 to 100 $\mu m^2$ in size.

The process can be used to achieve gray scale with all the liquid crystal mediums described in U.S. Pat. No. 5,032,009 and polymerizable liquid crystals described in U.S. Pat. No. 5,073,294 which are incorporated by reference. The process is especially useful for achieving gray scale with nematic liquid crystals, guest-host mixtures containing anisotropically absorbing molecules such as azo and poly(azo) dyes, herein described above, dissolved in nematic liquid crystals; and polymerizable nematic liquid crystals. Specific liquid crystals that are preferred for the process include 4-cyano-4'-alkylbiphenyls, 4-alkyl-(4'-cyanophenyl)cyclohexanes and guest-host mixtures derived from them.

One Liquid Crystal Layer (x=0)

A preferred embodiment of the invention (FIG. 5) comprises one liquid crystal layer and no repetition 4 (X=0). The single liquid crystal layer can have one or two optical alignment layers. There are several alternative constructions of the optical storage medium that fall within this embodiment.

One preferred optical storage medium has one optical alignment layer and the second alignment layer is an optically inactive, conventional alignment layer. The liquid crystal layer has three or more twisted alignment states, and more preferably between 4 and 2000 twisted alignment states, in selected regions of the liquid crystal layer. Exposure of the optical alignment layer in selected areas to polarized light within the absorption band of the optical alignment layer allows rotation of the liquid crystal director on that surface while the second surface remains fixed. The value of the twist is controlled and varied from one region to the next as described above.

Another preferred optical storage medium has two optical alignment layers and the liquid crystal layer has three or more twisted alignment states, and more preferably between 4 and 2000 twisted alignment states, in selected regions. To accomplish this one optical alignment layer can be exposed uniformly with polarized light to establish a uniform background alignment on one optical alignment layer. Exposure of the second optical alignment layer to polarized light while varying the polarization light vector in selected areas allows rotation of the liquid crystal director on the second surface. The value of the twist can be controlled as stated above.

Another preferred optical storage medium has two optical alignment layers and three or more alignment states, and more preferably between 4 and 2000 alignment states, having different local birefringence axes in the plane of the alignment layers. This can be accomplished by exposing selected regions of both optical alignment layers equally with polarized light while varying the polarized light vector.

Another preferred optical storage medium has two identical optical alignment layers and three or more combination alignment states, and more preferably between 4 and 2000 combination alignment states, having different local birefringence axes in the plane of the alignment layers and different twisted alignment states. This can be accomplished by exposing each optical alignment layer differently with polarized light while varying the polarized light vector.

Another preferred optical storage medium has two different optical alignment layers with different absorbance characteristics and three or more different twisted alignment states, and more preferably between 4 and 2000 twisted alignment states, in selected regions of the liquid crystal layer. One optical alignment layer is exposed uniformity with a first wavelength of polarized light to establish a uniform background alignment. The second optical alignment layer is exposed in selected areas with a second wavelength of polarized light while varying the polarized light vector. This allows rotation of the liquid crystal director on the second surface. The value of the twist can be controlled as stated above.

Another preferred optical storage medium has two different optical alignment layers with different absorbance characteristics and three or more birefringent alignment states, and more preferably between 4 and 2000 birefringent alignment states. One optical alignment layer is exposed in selected areas with polarized light while varying the polarized light vector, the second alignment layer is exposed in selected areas with a second wavelength of polarized light. This allows, in selected areas, independent rotation of the liquid crystal director on both surfaces.

Another preferred optical storage medium has two different optical alignment layers with different absorbance characteristics and three or more combination alignment states, and more preferably between 4 and 2000 combination alignment states. One optical alignment layer is exposed in selected areas with polarized light while varying the polarized light vector, the second alignment layer is exposed in selected areas with a second wavelength of polarized light. This allows, in selected areas, independent rotation of the liquid crystal director on both surfaces.

Another preferred optical storage medium with one liquid crystal layer has patterned electrodes on one or more of the substrates. The substrates can be indium-tin-oxide (ITO) coated glass plates, for instance. The ITO electrodes are patterned using conventional lithographic processes. With an applied electric field, selected regions of the optical storage medium can be addressed or read. This can simplify and/or speed-up write/read operations.

The optical storage medium described in this invention has numerous applications in data storage. It can be used as the data storage medium for high density CD, CD-R, CD-E, photographic image, storage display and for combined effects of two or more liquid crystal layers. Several applications of the optical storage medium of this invention are discussed below.

An optical storage medium with one liquid crystal layer with encoded twist alignment states which correspond to digital information can be used as a compact disc (CD) or compact disc read only memory (CDROM). The optical storage medium is sandwiched between a pair of polarizers. The encoded digital information is read with a light beam passing through each aligned region and the recording of transmitted or reflected light intensity by a suitable photodetector. The recorded intensity information is further processed as a function of location of the aligned regions and the magnitude of the transmitted or reflected intensity.

An optical storage medium with one liquid crystal layer with encoded twist alignment states can be used as a write-once-read-many (WORM or CD-R) memory. The encoding step can be accomplished by exposing selected regions of the optical alignment layer with polarized light while varying the polarized light vector. The exposed regions correspond to desired digital information. The encoded digital information can be read many times as described for the CD with twist alignment states.

An optical storage medium with one liquid crystal layer with encoded twist alignment states can be used as an erasable compact disc (CD-E) with write rewrite capability. The alignment state in each region can be changed by changing the direction of polarized light vector of the write beam described above. New information is then stored and can be read subsequently as described for the CD with twist alignment states.

Photographic images can be stored in the optical storage medium with one liquid crystal layer with encoded twist alignment states. The images are invisible without polarizers. The photograph can be read visually by placing the optical storage medium between a pair of polarizers. Positive or negative photographic images can be read with either having the absorption axes of the pair of polarizers in parallel or perpendicular to each other. Another interesting feature this medium is that these images have very wide viewing angle. Liquid crystal displayed images typically have narrow viewing angles as evidenced from commercial liquid crystal displays, calculators and laptop computers.

An optical storage medium with one liquid crystal layer with encoded birefringent alignment states which correspond to digital information can be used as a compact disc (CD) or compact disc read only memory (CDROM). The encoded digital information is read with a polarized light beam passing through each aligned region and the phase difference of transmitted or reflected light is determined with suitable combination of polarizers and/or interferometric techniques. The recorded intensity information is further processed as a function of location of the aligned regions and the magnitude of the phases of transmitted or reflected light.

An optical storage medium with one liquid crystal layer with the capability of encoded birefringent alignment states can be used as write-once-read-many (WORM or CD-R) memory. The encoding step can be accomplished by exposing selected regions of both optical alignment layers equally with polarized light while varying the polarized light vector. The exposed regions correspond to desired digital information. The encoded digital information can be read many times as described for the CD with birefringent alignment states.

An optical storage medium with one liquid crystal layer with the capability of encoded birefringent alignment states can be used as an erasable compact disc (CD-E). The alignment state in each region can be changed by changing the direction of polarized light vector of the write beam described above. New information is then stored and can be read subsequently as described for the CD with birefringent alignment states.

Photographic images can be stored in an optical storage medium with one liquid crystal layer with encoded birefringent alignment states. The photograph can be read visually with suitable combination of polarizers and/or interferometric techniques, such as holographic techniques. Positive or negative photographic images can be read with suitable arrangement of the interferometric techniques.

An optical storage medium with one liquid crystal layer with encoded combination alignment states which correspond to digital information can be used as a compact disc (CD) or compact disc read only memory (CDROM). The encoded digital information is read with a light beam passing through each aligned region and the recording of the phase and/or intensity of transmitted or reflected light by a suitable combination of interferometric techniques, polarizers and photodetector. The recorded light information is further processed as a function of location of the aligned regions and the magnitude of the transmitted or reflected intensity.

An optical storage medium with one liquid crystal layer with the capability of encoded combination alignment states can be used as write-once-read-many (WORM or CD-R) memory. The encoding step can be achieved with the write beam of polarized light with varying polarized light vector and exposed regions which correspond to desired digital information. The encoded digital information can be read many times as described for the CD with combination alignment states.

An optical storage medium with one liquid crystal layer with the capability of encoded combination alignment states can be used as an erasable compact disc (CD-E). The alignment state in each region can be changed by changing the direction of polarized light vector of the write beam described above. New information is then stored and can be read subsequently as described for the CD with combination alignment states.

Photographic images can be stored in the optical storage medium with one liquid crystal layer with encoded combination alignment states. The photograph can be read visually with suitable combination of interferometric techniques and polarizers. Positive or negative photographic images can be read with suitable arrangement of interferometric apparatus and/or polarizers.

An optical storage medium with one or more liquid crystal layer with the capability of encoded mixture of twisted, birefringent and combination alignment states can be used as an erasable compact disc (CD-E). The alignment state in each region can be changed by changing the direction of polarized light vector of the write beam described above. New information is then stored and can be read subsequently as described for the CD with combination alignment states.

An optical storage medium with one liquid crystal layer with twist alignment states, birefringent alignment states or combination alignment states, can be used for a storage display. The photographic images described previously can be changed to new images with subsequent exposures to polarized light. In the case when the speed of the change of images becomes greater than video rate the display can be used for movies and televisions. At slower than video rate of change, the optical storage display can be used for changeable signs, for instance, to direct traffic flow. As mentioned above, an interesting advantage of this optical storage medium is the high viewing angle achievable, that is not typically found with conventional liquid crystal displays.

Two Liquid Crystal Layers (X=1)

In a preferred embodiment the optical storage medium with gray scale of this invention comprises two liquid crystal layers with one repetition 4 (X=1 in FIG. 5). The two liquid crystal layers can have one or two optical alignment layers within their respective alignment layer pairs. The optical alignment layers can have the same, or different, absorption characteristics. Preferably the first alignment layer pair has at least one optical alignment layer with said anisotropically absorbing molecules or moieties having an absorbance maxima between 150 nm and 400 nm, and a second alignment layer pair has at least one optical alignment layer with said anisotropically absorbing molecules or moieties having an absorbance maxima between 400 nm and 800 nm. There are several alternative designs of the optical storage medium that fall within this embodiment.

In one preferred optical storage medium with two liquid crystal layers, each alignment layer pair has one optical alignment layer and the second alignment layer is an optically inactive, conventional alignment layer. The optical alignment layers are preferably coated on the facing surfaces of the two exterior substrates. The conventional alignment layers are coated back to back on the interior substrate. The liquid crystal layers have three or more twisted alignment states, and more preferably between 4 and 2000 twisted alignment states, in selected regions of each liquid crystal layer. Exposure of the optical alignment layer in selected areas to polarized light within the absorption bands of the optical alignment layers allows rotation of the liquid crystal director on that surface while the second surface remains fixed. The optical alignment layers can be exposed independently of one another by exposure before construction of the completed cell, or, by exposure from either side of the completed cell. The value of the twist is controlled and varied from one region to the next as described above.

In another preferred optical storage medium with two liquid crystal layers, each alignment layer pair has one optical alignment layer and the second alignment layer is an optically inactive, conventional alignment layer. The optical alignment layers have different absorbance maxima, are sensitive to different wavelengths of light and are preferably coated on the facing surfaces of the two exterior substrates. The conventional alignment layers are coated back to back on the interior substrate. The liquid crystal layers have three or more twisted alignment states, and more preferably between 4 and 2000 twisted alignment states, in selected regions of each liquid crystal layer. Exposure of the optical alignment layer in selected areas to linearly polarized light within the absorption bands of the optical alignment layers allows rotation of the liquid crystal director on that surface while the second surface remains fixed. The optical alignment layers can be exposed independently of one another by exposure before construction of the completed cell, or, by exposure from either side of the completed cell. The value of the twist is controlled and varied from one region to the next as described above.

Another preferred optical storage medium with two liquid crystal layers, each alignment layer pair has two similar optical alignment layers but each alignment layer pair has a different absorbance maximum as indicated above. The liquid crystal layers each have three or more twisted alignment states, and more preferably between 4 and 2000 twisted alignment states, in selected regions. To accomplish this, one optical alignment layer of each alignment layer pair is exposed uniformly with polarized light of wavelength within the absorbance band of the anisotropically absorbing molecules or moieties to establish a uniform background alignment on one optical alignment layer. Exposure of the second optical alignment layer to polarized light of similar wavelength while varying the polarized of light vector in selected areas allows rotation of the liquid crystal director on the second surface. The value of the twist can be controlled as stated above and the liquid crystal layers can be aligned independently of each other using two different wavelengths of light.

Another preferred optical storage medium with two liquid crystal layers, each alignment layer pair has two similar optical alignment layers but each alignment layer pair has a different absorbance maximum. The liquid crystal layers each have three or more birefringent alignment states, and more preferably between 4 and 2000 birefringent alignment states, in selected regions. To accomplish this, both optical alignment layers of one alignment layer pair are exposed equally, in selected regions, with polarized light of wavelength within their absorbance band while varying the polarized light vector. The second alignment layer pair can be addressed with a second wavelength of polarized light in a similar manner. The liquid crystal layers can be aligned independently of each other using two different wavelengths of light before or after the cell is constructed.

In another preferred optical storage medium with two liquid crystal layers, each layer has two optical alignment layers with different absorbance characteristics. The liquid crystal layers have three or more combination alignment states, and more preferably between 4 and 2000 twisted alignment states, in selected regions of each liquid crystal layer. One optical alignment layer is exposed in selected areas with polarized light while varying the polarized light vector, the second alignment layer is exposed in selected areas with a second wavelength of polarized light. This allows, in selected areas, independent rotation of the liquid crystal director on both surfaces. The process is repeated for the second alignment layer pair. The optical alignment layers can be exposed independently of one another by exposure before construction of the completed cell, or, by exposure from either side of the completed cell.

Another preferred optical storage medium with two liquid crystal layer has patterned electrodes on one or more of the substrates. The substrates can be indium-tin-oxide (ITO) coated glass plates, for instance. The ITO electrodes are patterned using conventional lithographic processes. With an applied electric field, selected regions of one or both of the liquid crystal layers can be addressed or read. This can simplify and/or speed up write/read operations.

An optical storage medium with two liquid crystal layers with encoded twist alignment states which correspond to digital information can be used as a compact disc (CD) or compact disc read only memory (CDROM). The optical storage medium is sandwiched between a pair of polarizers. Each liquid crystal layer is addressed or read by suitable focusing and collecting optics of the read light beam. The encoded digital information is read with a light beam passing through each alignment region and the recording of transmitted or reflected light intensity by a suitable photodetector. The recorded intensity information is further processed as a function of each layer, location of the alignment regions, and the magnitude of the transmitted or reflected intensity.

An optical storage medium with two liquid crystal layers with the capability of encoded twist alignment states can be used as write-once-read-many (WORM or CD-R) memory. The encoding step can be accomplished by exposing selected regions of the selected optical alignment layers with polarized light while varying the polarized light vector. The illuminated regions correspond to desired digital information. The encoded digital information can be read many times as described for the CD with twist alignment states above.

An optical storage medium with two liquid crystal layers with the capability of encoded twist alignment states can be used as an erasable compact disc (CD-E). The alignment state in each region can be changed by changing the direction of polarized light vector of the write beam described above. New information is then stored and can be read subsequently as described for the CD with twist alignment states above.

Photographic images can be stored in an optical storage medium with two liquid crystal layers with encoded twist alignment states. The image is invisible without polarizers. The photograph can be read visually by selecting the liquid crystal layer to be read with suitable focusing and collecting optics and placing the optical storage medium between a pair of polarizers. Positive or negative photographic images can be read with either having the absorption axes of the pair of polarizers in parallel or perpendicular to each other.

An optical storage medium with two liquid crystal layers with encoded birefringent alignment states which correspond to digital information can be used as a compact disc (CD) or compact disc read only memory (CDROM). The encoded digital information of each liquid crystal layer is read with a polarized light beam passing through each aligned region of the selected layer by suitable focusing and collecting optics and the phase difference of transmitted or reflected light is determined with a suitable combination of polarizers and/or interferometric techniques. The recorded intensity information is further processed as a function of location of each layer, aligned regions and the magnitude of the phases of transmitted or reflected light.

An optical storage medium with two liquid crystal layers with the capability of encoded birefringent alignment states can be used as write-once-read-many (WORM or CD-R) memory. The exposed regions correspond to desired digital information. The encoded digital information can be read many times as described above for the CD with birefringent alignment states.

An optical storage medium with two liquid crystal layers with the capability of encoded birefringent alignment states can be used as an erasable compact disc (CD-E). The alignment state in each region of the selected layer can be changed by changing the direction of polarized light vector of the write beam described above. New information can be subsequently read as described above for the CD with birefringent alignment states.

Photographic images can be stored in an optical storage medium with two liquid crystal layers with encoded birefringent alignment states as described before. The photograph can be read visually with a suitable combination of polarizers and/or interferometric techniques. Positive or negative photographic images can be read with suitable arrangement of the interferometric apparatus.

An optical storage medium with two liquid crystal layers with encoded combination alignment states which correspond to digital information can be used as a compact disc (CD) or compact disc read only memory (CDROM). The encoded digital information is read with a light beam passing through each aligned region of the selected layer with the use of suitable focusing and collecting optics and the recording of the phase and/or intensity of transmitted or reflected light by a suitable combination of interferometric techniques, polarizers and photodetector. The recorded light information is further processed as a function of each liquid crystal layer, location of the aligned regions and the magnitude of the transmitted or reflected intensity.

An optical storage medium with two liquid crystal layers with the capability of encoded combination alignment states can be used as write-once-read-many (WORM or CD-R) memory. The encoding step can be achieved with the write beam of polarized light with varying polarized light vector and illuminated selected regions which correspond to desired digital information. The encoded digital information can be read many times as described above for the CD with combination alignment states.

An optical storage medium with two liquid crystal layers with the capability of encoded combination alignment states can be used as an erasable compact disc (CD-E). The alignment state in each selected region can be changed by changing the direction of polarized light vector of the write beam. New information is then stored and can be read subsequently as described above for the CD with combination alignment states.

Photographic images can be stored in an optical storage medium with two liquid crystal layers with encoded combination alignment states. The photograph can be read visually with suitable combination of collecting optics, interferometric techniques and polarizers. Positive or negative photographic images can be read with suitable combination of polarizers and/or interferometric techniques.

Optical storage media with two liquid crystal layers with twist alignment states, birefringent alignment states or combination alignment states, can also be used for storage displays. The photographic images described previously can be changed with new images with a write beam. In the case when the speed of the change of images becomes greater than video rate the display can be used for movies, and televisions. At slower than video rate of change, the optical storage display can be used for changeable signs, for instance, to direct traffic flow. As mentioned above, an interesting advantage of this optical storage medium is the high viewing angle achievable, that is not typically found with conventional liquid crystal displays.

Optical storage media with two or more liquid crystal layers with twist alignment states, birefringent alignment states or combination alignment states can also be used for combined effects of the two or more layers. With suitable focusing and collecting optics the combined effect of the two layers can be read out similarly as described earlier. Such optical storage media can be used in signal processing or information processing applications such as optical signal correlation, optical logic operation, spatial filters and optical computing.

This invention is demonstrated in the following examples, which are illustrative and not intended to be limiting.

EXAMPLE 1

This example illustrates the formation of dye 3.

4-Nitroaniline (5.5 g) was dissolved in 12N hydrochloric acid (10.8 mL) and distilled water (7 mL). The mixture was cooled below 5° C. and 2M sodium nitrite solution (22 mL) gradually added. The mixture was stirred for 1 h, urea (1.0 g) was added, and stirring continued for another 5 minutes. The solution was poured into a second solution containing 5-methoxy-2-methyl aniline (5.48 g), sodium acetate (12.0 g) and acetic acid (40 mL). The mixture was stirred occasionally for 1.5 h at 5° C., and filtered to give a red solid. The solid was recrystallized twice from ethanol-tetrahydrofuran to give 2-methyl-5-methoxy-4-(4'-nitrophenylazo)-benzenamine. This material (2.86 g) was heated to 65° C. in ethanol (120 mL). Sodium hydrogen sulfide (1.68 g) in water (20 mL) was added and the mixture stirred for 20 minutes. Water (60 mL) was added and the mixture cooled and filtered. The solid collected was recrystallized from ethanol to give dye 3: mp 136°–137° C., $\lambda_{max}$=416 and 458 nm, $\epsilon$=38,200 and 28,600, respectively.

EXAMPLE 2

This example illustrates the preparation of guest/host diazodiamine 1/SPI-2000 polyimide optical alignment layers (designated S1).

Polyimide formulation SPI-2000 (0.5 g) was mixed with diazodiamine 1 (69.8 mg) and N-methyl-2-pyrrolidone (9.9 g). The mixture was stirred 1 h at room temperature. The solution was filtered through a 0.45 $\mu$m Teflon filter membrane directly onto the surface of clean glass substrates. The coated glass substrates were then spun at 2500 RPM for 1 min to produce uniform thin films. The resultant thin films were cured under nitrogen 1 h at 100° C. followed by 2 h at 195° C.

EXAMPLE 3

This example illustrates the preparation of covalently bonded diazodiamine 1 in polyimide polymer alignment layers.

3,3',4,4'-Benzophenone tetracarboxylic dianhydride (40.25 mg) was mixed with diazodiamine 1 (46.75 mg) and dry N-methyl-2-pyrrolidone (1.65 g). The mixture was stirred 18 h at room temperature under argon. This poly (amic acid) prepolymer solution was diluted to 1 wt % solids with tetrahydrofuran (6.96 g). The solution was filtered through a 0.45 $\mu$m Teflon filter membrane directly onto the surface of clean glass substrates. The coated substrates were spun at 2500 RPM for 1 min to produce uniform thin films. The resultant thin films were cured under nitrogen 15 min at 80° C. followed by heating 1 h at 180° C. The thin film $\lambda_{max}$=376 with a strong shoulder at 472 nm.

EXAMPLE 4

This example illustrates the preparation of covalently bonded 4,4'-diaminostilbene, 2, in polyimide polymer alignment layers.

3,3',4,4'-Benzophenone tetracarboxylic dianhydride (40.25 mg) was mixed with 4,4'-diaminostilbene, 2, (26.25 mg), and dry N-methyl-2-pyrrolidone (1.26 g). The mixture was stirred 18 h at room temperature under argon. This poly(amic acid) prepolymer was diluted to 1 wt % solids with tetrahydrofuran (5.32 g). The solution was filtered through a 0.45 μm Teflon filter membrane directly onto the surface of clean glass substrates. The coated substrates were spun at 2500 RPM for 1 min to produce uniform thin films. The resultant thin films were cured under nitrogen 15 min at 80° C. followed by heating 1 h at 180° C. Thin film $\lambda_{max}$=330 nm.

EXAMPLE 5

This example illustrates the preparation of covalently bonded monoazodiamine 3/polyimide polymer to give optical alignment layers (designated S2).

3,3',4,4'-Benzophenone tetracarboxylic dianhydride (40.25 mg) was mixed with monoazodiamine 3 (32.0 mg) and dry N-methyl-2-pyrrolidone (1.37 g). The mixture was stirred 18 h at room temperature under argon. This poly (amic acid) prepolymer solution was diluted to 1 wt % solids with tetrahydrofuran (5.78 g). The solution was filtered through a 0.45 μm Teflon filter membrane directly onto the surface of clean glass substrates. The coated substrates were spun at 2500 RPM for 1 min to produce uniform thin films. The resultant thin films were cured under nitrogen 15 min at 80° C. followed by heating 1 h at 180° C. Thin film $\lambda_{max}$=387 nm.

EXAMPLE 6

This example illustrates the preparation of a polymerizable nematic monomer formulation.

Methacrylate monomers Ia (114 mg), and Ib (114 mg), and dimethacrylate IIa (60 mg) were mixed with ethylene glycol dimethacrylate (9 mg), ZLI-1982 (EM Chemicals, Hawthorne N.Y.) nematic liquid crystal (15 mg), CB-15 chiral nematic dopant (15 μg) hydroquinone inhibitor (9 μg) and Irgacure 651 (Ciba Giegy, Ardsley N.Y.) photoinitiator (4 mg). The mixture was heated to 85° C. and stirred for 2 min and cooled to room temperature. At room temperature a nematic liquid crystal mesophase formed: nematic-isotropic transition=43.2° C.

EXAMPLE 7

This example demonstrates twist alignment states in a liquid crystal layer between two optical alignment layers with the optical alignment layers exposed prior to assembly of the cell.

Borosilicate glass substrates (2"×2"×1 mm; Donnelly Corp., Holland, Mich.) were coated and cured with the guest/host diazodiamine 1/SPI-2000 polyimide formulation of Example 2 to give optical alignment layers.

Figure 6:
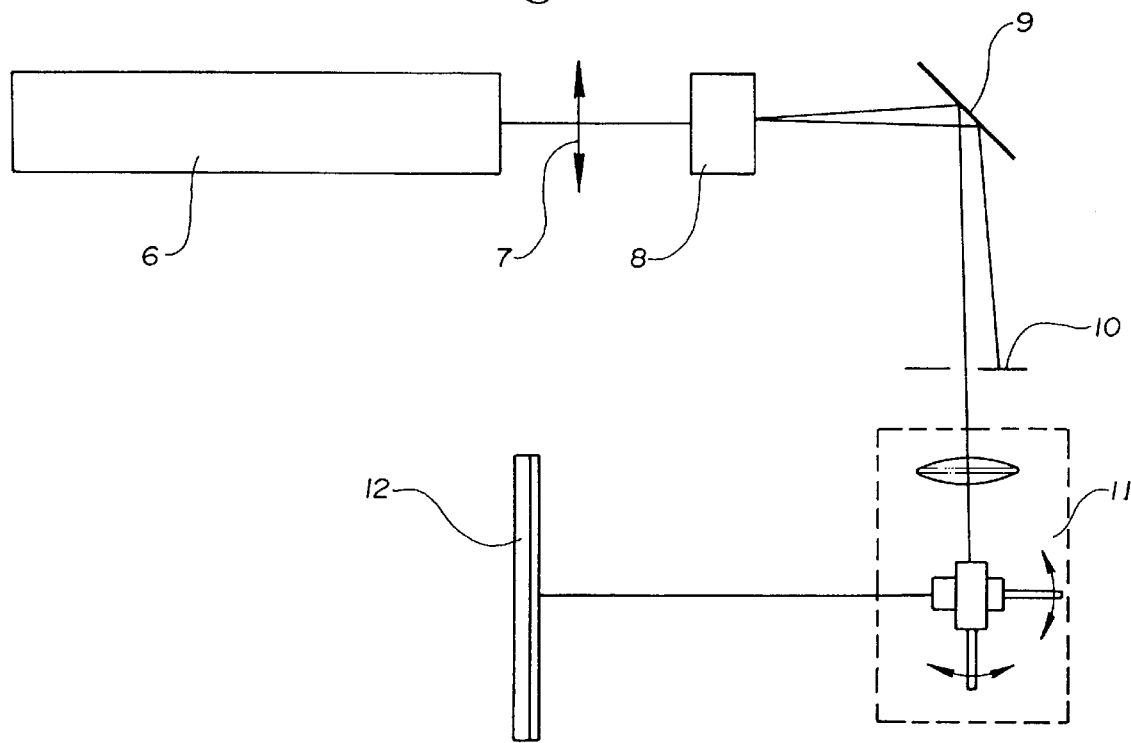
FIG. 6 illustrates the exposure set-up used for background optical alignment with polarized light.

Two substrates were subsequently exposed with polarized light which induced the background alignment of the liquid crystal when the liquid crystal cell was assembled. A schematic of the illumination set-up is depicted in FIG. 6. The laser 6 was a commercial Argon laser Model #2020-03 (Spectra-Physics, Piscataway, N.J.) which gave a maximum power of approximately 2.5 Watts at the 514.5 nm and was polarized vertically 7. The laser beam was passed through an acousto-optic modulator 8, Model #AOM-40 (Intra-Action Corporation, Bellwood, Ill.) which modulated the laser beam. The laser beam subsequently was reflected off a mirror 9, passed through a aperture 10, and entered a two-axis scanning mirror system with focussing lens 11, (Model #LK5100, General Scanning, Watertown, Mass.) which was computer controlled. The scanner directed the focussed polarized laser beam onto the optical alignment layer 12 and scanned the beam back and forth across the layer taking approximately 15 micron steps between each subsequent scan line. The laser beam was turned on and off via the acousto-optic modulator 8 which is controlled by the scanner electronics. The total laser power incident onto the coated substrates was 1.7 Watts and the laser beam was focussed to approximately 30 μm in diameter at the coated substrates by the scanner optics.

After exposure for background alignment, one coated substrate was placed at the scanner focus and rotated 10 degrees about the normal of the substrate from it's original position. A 1 cm circle was subsequently scanned in one quadrant of the coated substrate. The substrate was then shifted into the second quadrant and rotated 30 degrees from it's initial position. A second circle was scanned in this quadrant. This was repeated for the two remaining quadrants for 60 degrees and 90 degrees from the substrate's initial position.

A liquid crystal cell was constructed from the two exposed coated substrates. Mylar strips (55 μm) were placed on one coated substrate and the other substrate was sandwiched on top of it. The optical alignment layers were facing each other and the background alignment directions were mutually parallel. The substrates were pressed to a 55 micrometer spacing using clamps, epoxy was applied along the edges and the epoxy was cured for 5 mins. Two spaces on opposite edges of the cell were left unsealed. One unsealed opening on the cell was dipped into ZLI-1982 nematic liquid crystal (EM Industries, Inc., Hawthorne, N.Y.) with 0.02 weight % CB-15 chiral dopant (EM Industries, Inc.) mixed with the liquid crystal. The cell filled by capillary action. After filling, the cell was removed from the liquid crystal, cleaned up, and the spaces sealed with epoxy.

Figure 7:
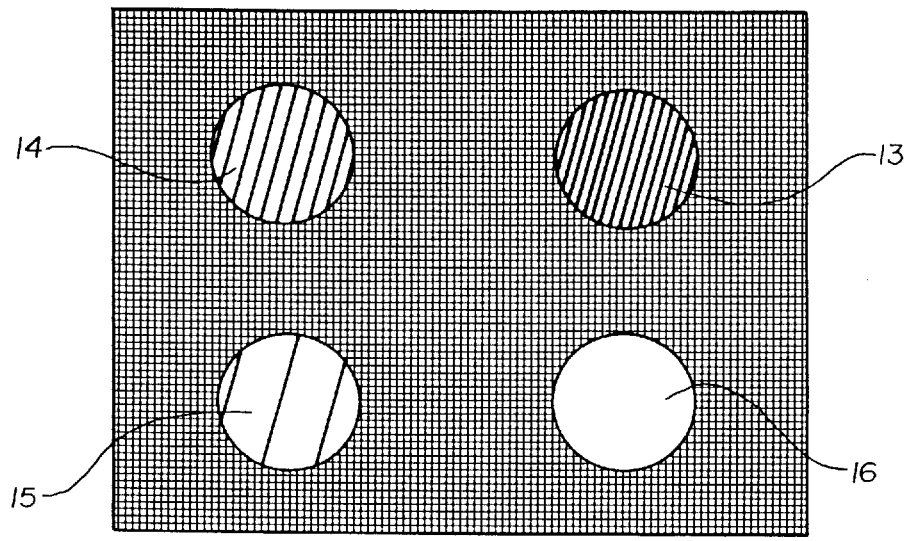
FIG. 7 illustrates gray scale of an optical storage medium of this invention exposed to four different polarized light vectors to achieve four different twisted alignment states.

FIG. 7 demonstrates how the cell appeared when viewed between crossed polarizers on a photographic light box. The background alignment direction was along one of the input polarizer's transmission axis. The input polarizer polarizes the light along the background alignment. The output polarizer blocks the transmission of the light since its transmission axis is crossed to the input polarizer's transmission axis. As a result, the background of the cell appeared uniformly dark.

In the area of the circles, the one substrate that was exposed once aligned along the background while the other substrate which was exposed multiple times aligned the liquid crystal by 10, 30, 60, and 90 degrees (equal to the angle the substrate was rotated during exposure of the circle). This resulted in a twisted nematic alignment of the liquid crystal with twist angles equal to 10, 30, 60, and 90 degrees (13, 14, 15, and 16, respectively in FIG. 7). The twisted nematic states cause the polarization vector of the polarized light to rotate by an amount equal to the twist angle Consequently, the 10, 30, 60, and 90 degree circles were progressively brighter (represented by a progressively lower density of hatched lines in FIG. 7) in transmission relative to the background transmission. The 90 degree circle was brightest. Therefore, four levels of gray were observed relative to the background.

EXAMPLE 8

This example demonstrates a high resolution 2-dimensional photographic image with greater than 16 and less or equal to 256 alignment states. Twist alignment states in a liquid crystal layer were established after the cell was assembled and filled with a liquid crystal. One alignment layer was a conventional mechanically rubbed polyimide, the other was an optical alignment layer.

A diazodiamine 1/SPI-2000 polyimide (S1) coated substrate (2"×2"×1 mm) was optically background aligned as in Example 7. Another similar substrate had SPI-2000 polyimide solution spun onto the surface. The SPI-2000 coated substrate was cured in an oven. The background alignment of the SPI-2000 coated substrate was mechanically induced by rubbing the coated side of the substrate unidirectionally across a fibrous cloth. A 55 μm cell was fabricated as in Example 7 with the optical alignment layer and the SPI-2000 mechanically aligned layer facing each other to give mutually parallel alignment. The cell was filled with the same liquid crystal mixture as described in Example 7. The liquid crystal was observed to be uniformly parallel aligned when the cell was viewed between polarizers.

Figure 8:
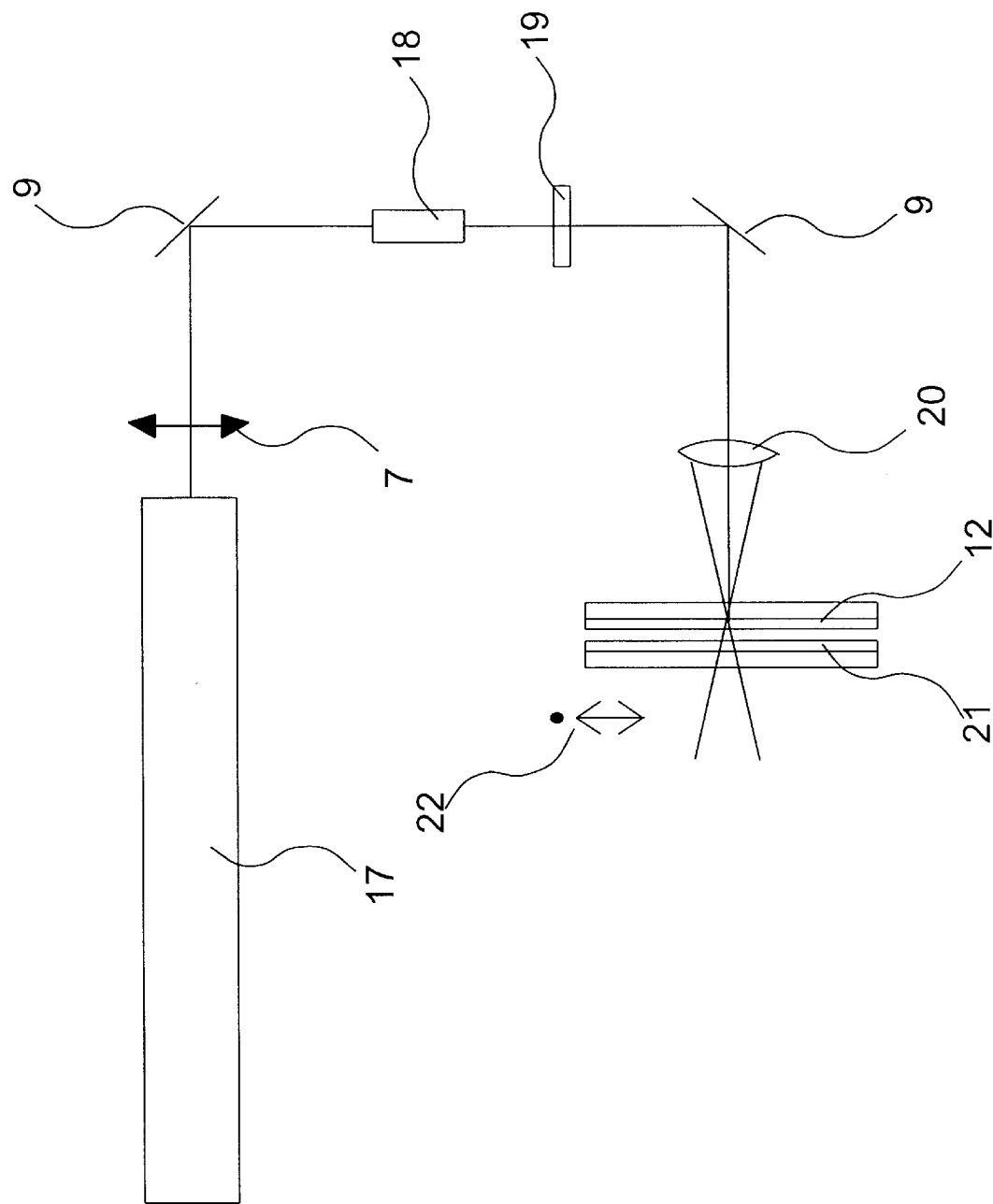
FIG. 8 illustrates the exposure set-up for achieving photographic images with 256 level gray scale.

The assembled cell was placed into the optical exposure set-up of FIG. 8. The cell was mounted onto two motorized translation stages mounted to move the cell in the X–Z plane (represented by double-headed arrow and dot 22 in FIG. 8) which is located at the focal point of the 15 cm focal length lens 20. The substrate with the optical alignment layer 12 was mounted closest to the 15 centimeter focal length lens 20. The substrate coated with the mechanically buffed polyimide layer 21 was insensitive to the incident polarized light. The electro-optical modulator 18 (Conoptics of Danbury, Conn.) combined with the quarter-wave plate 19 in the proper orientation changes the output linear polarization state of the 514.5 nm light from the Innova 400 Argon laser 17 (Coherent, Inc., of Santa Clara, Calif.) as a function of applied voltage. The linear polarization state was rotated from 45 to –45 degrees in the X–Z plane at the cell when the voltage on the modulator driver is driven from 0 to 1 volt. The modulator and translation stages were computer controlled.

To write the high resolution into the cell, a 702×738 pixel digital photographic image of a person with 256 levels gray was used by the computer to determine the angle of the incident polarization onto the cell mounted in the experimental set-up. The correct value of the voltage was calculated from the grayscale level in the image taking into account that the final cell would be viewed between polarizers. For a 0 grayscale level in the image, the corresponding voltage on the modulator was 0 volts. For this voltage, the polarization state incident onto the cell was 45 degrees in the plane of the substrate. Thus, the resulting twist angle was –45 degrees which gave a dark alignment state when viewed between polarizers with the transmission axes at 45 degrees to each other.

For each pixel in the image a corresponding exposure of the cell occurred for 13 msec at the proper polarization angle for the pixel grayscale value. The cell was translated along the X axis at approximately 3 mm/sec which resulted in an alignment region of approximately 38 μm being exposed on the cell during the 13 msec. After all 702 exposures were performed in a given row of the image, the cell was translated 38 μm along the Z axis and the next row was exposed. The step along the Z axis was repeated 738 times for the given image. The total exposed region on the cell was approximately 1"×1".

Since only the diazodiamine 1/SPI-2000 polyimide alignment layer was sensitive to the incident light, the liquid crystal contacting this layer was rotated by the polarized light whereas the liquid crystal contacting the mechanically aligned polyimide alignment layer remained unaffected by the incident light. This resulted in each approximately 38 μm×38 μm exposed alignment region to have a twisted alignment state with the twist angle depending on the grayscale of the original digitized pixel in the computer image.

After exposure, the cell showed no visible signs of the alignment regions or the image when viewed in unpolarized light (without polarizers). However, when the exposed cell was viewed between polarizers at 45 degrees to each other, a positive (image in cell corresponded to the computer image), high resolution (702×738 alignment regions in 1"×1" area), image of a person was visible. By rotating the output polarizer 90 degrees to the –45 degree position relative to the input polarizer, a negative (image in cell had the light and dark regions reversed from the original computer image) high resolution image of a person was observed. The image looked identical to the original computer image with visual examination. The image had wide viewing angle in contrast to conventional liquid crystal displays.

EXAMPLE 9

This example demonstrates twist alignment states in a liquid crystal layer between two different optical alignment layers sensitive to different wavelengths. Only one optical alignment layer is exposed, after the cell is assembled and filled, to create alignment regions with twisted alignment states. A superfluorinated liquid crystal layer is used in this example.

A glass substrate (0.9"×1.2"×1 mm) was spin coated with diazodiamine 1/SPI-2000 polyimide to give an S1 optical alignment layer. A second similar substrate was spin coated with the monoazodiamine 3/polyimide polymer to give an S2 optical alignment layer. Both coatings were subsequently cured in an oven.

Figure 9:
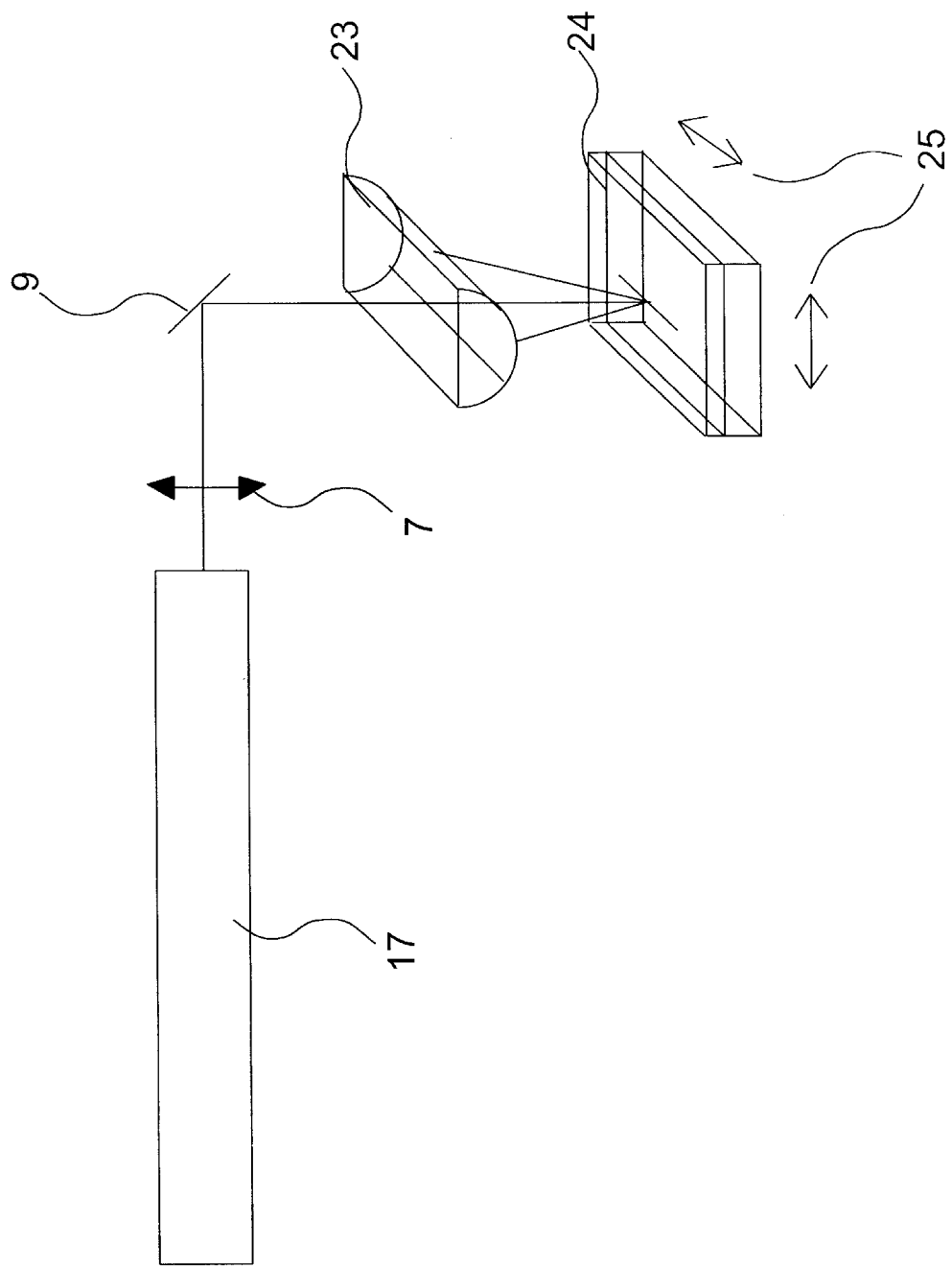
FIG. 9 illustrates the exposure set-up for background optical alignment with ultra-violet polarized light.

The S1 coated substrate was background aligned as in Example 7. The S2 coated substrate was background aligned using the set-up schematically represented in FIG. 9. In this experiment the S2 coated substrate 24 was mounted onto a 2-axis XZ translation stage (indicated by double-headed arrows 25 in FIG. 9) with the coated side facing the incident laser beam. The Innova 400 laser 17 was tuned to lase in the ultraviolet with wavelengths ranging from 333 to 364 nm. A 5 cm focal length cylindrical lens 23 focused the incident 1 cm beam to a line (1 cm×200 μm) onto the S2 coated substrate 24. The coated substrate was translated at a constant speed along the Z direction and then stepped in the X direction. This was repeated until the coated substrate had been completely exposed.

A cell was fabricated from the two background aligned substrates as described in Example 7 and filled with MLC-6043-000 (EM Industries, Inc., Hawthorne, N.Y.). The cell demonstrated uniform, parallel, background alignment when viewed between polarizers.

The cell was subsequently exposed in the scanning set-up described in Example 7 and FIG. 6. Circles of 1 millimeter diameter were exposed for various orientations of the half-wave plate added to the set-up just before the scanner system 11. The polarization state of the incident light is rotated by twice the angle that the half-wave plate is rotated. Therefore, a simple method of controlling the light polarization orientation in the plane of the cell was achieved by rotating the half-wave plate. The S1 coated substrate of the cell was sensitive to the 514.5 nm light used in the scanner set-up. Thus, that substrate was closest to the incident beam. Four circles were exposed for the half-wave plate rotation angles 5, 15, 30, and 45 degrees which corresponds to a change of the polarization angle in the plane of the S1 coated substrate of 10, 30, 60, and 90 degrees.

The cell was oriented so that the light polarization was perpendicular to the background alignment prior to rotation of the half-wave plate. Since the S1 coated substrate was the only substrate sensitive to the 514.5 nm light, the liquid crystal demonstrated a twisted alignment state in each of the 1 millimeter circles corresponding to the twist angle 10, 30, 60, and 90 degrees. When viewed between polarizers, four levels of gray were observed.

EXAMPLE 10

This example demonstrates two liquid crystal layers with twist alignment states. In addition, the optical alignment layer in each alignment layer pair is exposed to polarized light, after the multi-layer cell is assembled and filled, to create alignment regions with different twisted alignment states in each liquid crystal layer.

Two substrates (0.9"×1.2"×1 mm) were spin coated with diazodiamine 1/SPI-2000 polyimide as in Example 9. A third substrate was coated with Nissan SE-7311 polyimide solution (Brewer Science, Rolla, Mo.) and designated S3. These substrates were cured in an oven. The S3 coated substrate was spin coated again with Nissan SE-7311 polyimide on the opposite side of the substrate coated with the first S3 layer. It was subsequently cured in the oven.

The S1 coated substrates were background aligned by the scanner system as described in Example 7. Each side of the double-sided S3 coated substrate was background aligned using the mechanical buffing technique described in Example 8.

A multi-layer cell was assembled as follows. Mylar spacers (55 $\mu$m) were placed onto an S1 coated substrate, the double-sided S3 coated substrate was placed on top of the Mylar spacers, mylar spacers were placed onto the opposite side of the double-sided S3 coated substrate, and then the second S1 coated substrate was placed on top of the second set of mylar spacers. The three substrate cell was clamped and sealed with epoxy as in Example 7. MLC6043-000 liquid crystal was capillary filled into both of the cell gaps simultaneously. The multi-layer cell was then cleaned up and the fill ports sealed with epoxy. Both liquid crystal layers in the multi-layer cell demonstrated uniform, parallel, background alignment when viewed between polarizers.

The multi-layer cell was mounted in the scanner set-up as in Example 9 with one S1 coated substrate next to the incident laser beam. Four 1 mm circles were exposed as described in Example 9 generating twisted alignment states with four twist angles in the first liquid crystal layer. The multi-layer cell was subsequently flipped with the second S1 coated substrate closest to the incident laser beam and the four 1 mm exposures were repeated. This generated four twist angles in the second liquid crystal layer. Care was taken to prevent overlap of the alignment regions in each liquid crystal layer for easier viewing and analysis of the multi-layer cell. When the multi-layer cell was viewed between polarizers, four levels of gray were observed in each liquid crystal layer.

EXAMPLE 11

This example demonstrates two liquid crystal layers with twist alignment states. Each liquid crystal layer is controlled by optical alignment layers sensitive to different wavelengths. In addition, the optical alignment layer in each alignment layer pair is exposed with different wavelengths, after the multi-layer cell is assembled and filled, to create regions with a twisted alignment state in each liquid crystal layer.

A multi-layer cell was assembled as in Example 10 except one of the S1 coated substrates is replaced by an S2 coated substrate from Example 9. The middle plate was still the double-sided S3 coated substrate that was mechanically buffed on both sides. Prior to cell assembly, the S1 coated and S2 coated substrates were background aligned as in Example 10 and Example 9, respectively.

The S1 coated side of the multi-layer cell was subsequently exposed with four 1 mm circles as described in Example 10. The S2 coated side of the multi-layer cell was placed closest to the incident beam in the ultra-violet set-up of Example 9. A thin aluminum plate with a 1 mm hole in it was placed on top of the cell to serve as a mask. The cell was mounted with the background alignment perpendicular to the polarization of the incident beam. To facilitate viewing, care was taken to insure the exposed regions on the S2 side did not overlap with those on the S1 side of the multi-stack cell. The cell was rotated 10 degrees about the normal to the substrates and subsequently translated under the focussed beam via the X–Z translation stages as in Example 9. The mask prevented illumination of the cell except through the 1 mm hole. The process was repeated for different positions on the cell for 30, 60, and 90 degree rotations. When the multi-layer cell was viewed between polarizers, four levels of gray were observed in each liquid crystal layer.

EXAMPLE 12

This example demonstrates two liquid crystal layers with twist alignment states. The two alignment layer pairs are comprised of two optical alignment layers which are sensitive to different wavelengths. In addition, only one optical alignment layer in each alignment layer pair is exposed to polarized light, after the multi-layer cell is assembled and filled, to create regions with a twist alignment states.

A multi-layer cell was assembled as in Example 10 except the double-sided S3 coated substrate was replaced by two 0.9"×1.2" S2 coated substrates glued together. Prior to cell assembly and after background aligning the two S2 coated substrates as in Example 9, the two S2 coated substrates were glued together with the S2 coated sides facing out. Norland 60 photocured adhesive (Norland, New Brunswick, N.J.) was used to glue the substrates together. An unpolarized low power black light was used to cure the glue. This resulted in a double-sided S2 coated substrate which was 2 mm thick and was used with the two S1 coated substrates to construct the multi-layer cell.

Exposure of each side of the multi-layer cell was performed as in Example 10. When the multi-layer cell was viewed between polarizers, four levels of gray were observed in each liquid crystal layer.

EXAMPLE 13

This example demonstrates birefringent alignment states in a liquid crystal layer between two optical alignment layers.

Example 7 is repeated except both S1 coated substrates are exposed with 1 cm diameter circles in each quadrant after they are background aligned. Since the two S1 coated sides of the substrates will be facing each other, each circle in the second S1 coated substrate must be matched to the proper circle in the first S1 coated substrate to insure that no twist in the liquid crystal occurs. Thus, the aligned region will have its birefringent axes rotated a fixed amount relative to the background alignment. As a consequence, the circle exposed with a 10 degree rotation of the plate on the first substrate must be matched to a circle exposed with a minus 10 degree rotation on the second substrate. This would be repeated for each of the angles of rotation in each quadrant (i.e., 30 and −30 degrees, 60 and −60 degrees, and 80 and −80 degrees). The 90 degree case is degenerate and would appear the same as the background when viewed between polarizers.

The cell is assembled as in Example 7 taking care to overlap the appropriate circles of each substrate. The cell is capillary filled with ZLI-1982 with no chiral dopant. When the completed cell is viewed between polarizers, the 10 and 80 degree circles have a the same level of gray. The same applies for the 30 and 60 degree circles. However, the 10 and 30 (and, thus, the 80 and 60) have different levels of gray. Thus, for these four circles, only two levels of gray are observable. This is because the levels of gray repeat themselves every 45 degrees in the birefringent alignment states.

EXAMPLE 14

This example demonstrates combination alignment states in a liquid crystal layer between two optical alignment layers. Thus, a single alignment region can have the birefringent axes rotated at the alignment layer and also have twist from one alignment layer to the other.

Example 13 is repeated except the second S1 optical alignment layer is exposed to polarized light in four quadrants with the rotation angles equal to −20, 0, 90 and −30 degrees. Care is taken that the circles 10, 30, 60 and 80 degrees on the first S1 coated substrate overlap with the −20, 0, 90 and −30 degree circles on the second substrate, respectively. The constructed cell is capillary filled with ZLI-982 with 0.02 wt % of CB-15. The completed cell is viewed between polarizers. Four levels of gray are observable.

EXAMPLE 15

This example illustrates the polymerization of a liquid crystal layer having twist alignment states to give a polymer film with fixed twist alignment states.

A cell is prepared as described in Example 7 comprising two pre-exposed S1 optical alignment layers. The cell is filled with the polymerizable monomer composition described in Example 6 at 85° C. in the dark. The cell is allowed to anneal at room temperature for 2 h. The cell is then exposed to UV light (200 W Hg arc) for 30 seconds while submerged in ½ inch of water at 15° C. The four levels of gray, similar to that described in Example 7, are intact and fixed in the polymer film.

What is claimed is:

1. An optical storage medium with gray scale capability comprising:
    a plurality of facing substrates in series having one or more pairs of facing surfaces,
    alignment layers disposed on said pair(s) of facing surfaces to give alignment layer pair(s) wherein at least one of the alignment layers of each of said alignment layer pair(s) is an optical alignment layer, and wherein the optical alignment layer(s) comprise anisotropically absorbing molecules or moieties,
    liquid crystal layer(s) disposed between said alignment layer pair(s),
    wherein, each of said liquid crystal layer(s) comprises three or more alignment regions having three or more different alignment states, and
    wherein the different alignment states are controlled by exposure of said optical alignment layer(s) with polarized light of a wavelength or wavelengths within the absorption band of the anisotropically absorbing molecules or moieties therein.

2. An optical storage medium according to claim 1 wherein, each of said liquid crystal layers comprises four or more alignment regions having between four and two thousand different alignment states.

3. An optical storage medium according to claim 1 wherein said alignment states are twisted alignment states.

4. An optical storage medium according to claim 1 wherein said alignment states are birefringent alignment states.

5. An optical storage medium according to claim 1 wherein said alignment states are combination alignment states.

6. An optical storage medium according to claim 1 wherein there are two facing substrates and one liquid crystal layer.

7. An optical storage medium according to claim 1 wherein there are three facing substrates and two liquid crystal layers.

8. An optical storage medium according to claim 1 wherein there are between four and twenty-one facing substrates and between three and twenty liquid crystal layers.

9. An optical storage medium according to claim 1 wherein said anisotropically absorbing molecules or moieties have absorbance maxima between 150 nm and 1600 nm.

10. An optical storage medium according to claim 1 wherein said anisotropically absorbing molecules or moieties have absorbance maxima between 150 nm and 800 nm.

11. An optical storage medium according to claim 1 wherein said anisotropically absorbing molecules or moieties have absorbance maxima between 150 nm and 400 nm.

12. An optical storage medium according to claim 1 wherein said anisotropically absorbing molecules or moieties have absorbance maxima between 400 nm and 800 nm.

13. An optical storage medium according to claim 1 wherein said alignment regions are between 0.1 and 100 $\mu$m$^2$ in size.

14. An optical storage medium according to claim 1 wherein said liquid crystal layers are polymerizable liquid crystals.

15. An optical storage medium according to claim 14 wherein the polymerizable nematic liquid crystals are polymerizable nematic compositions comprising (A) 20 to 80 wt % of at least one monomer having the general formula (I) wherein n is 10, 12, or 14, and (B) 80 to 20 wt % of at least one monomer having the general formula (I) wherein n is 4, 6 or 8:

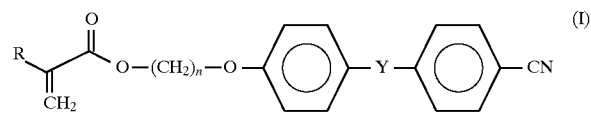

wherein R is CH$_3$ or H and Y is covalent bond or —CO$_2$—.

16. An optical storage medium according to claim 15 wherein the polymerizable nematic compositions further comprise 0.1 to 30 wt % of the difunctional methacrylate or acrylate monomers II:

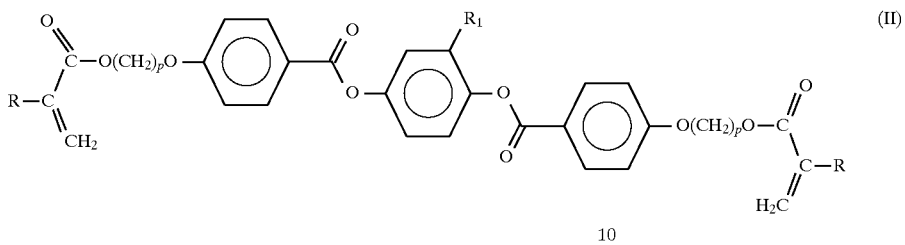

wherein R is $CH_3$ or H, $R_1$ is $CH_3$, H, Cl, $OCH_3$ and p=1–12.

17. An optical storage medium according to claim 14 wherein the polymerizable liquid crystals have been exposed to actinic radiation to form a polymer matrix.

18. An optical storage medium according to claim 1 wherein said liquid crystal layer(s) is(are) nematic liquid crystals.

19. An optical storage medium according to claim 18 wherein said nematic liquid crystals are selected from the group 4-cyano-4'-alkylbiphenyls and 4-alkyl-(4'-cyanophenyl)cyclohexanes.

20. An optical storage medium according to claim 1 wherein said liquid crystal layer(s) is(are) guest-host mixtures.

21. An optical storage medium according to claim 20 wherein said guest-host mixtures comprise the dichroic arylazo, di(arylazo), tri(arylazo), tetra(arylazo), penta (arylazo), anthraquinone, mericyanine, methine, 2-phenylazothiazole, 2-phenylazobenzthiazole, stilbene, 1,4-bis(2-phenylethenyl)benzene, 4,4'-bis(arylazo)stilbenes, perylene and 4,8-diamino-1,5-napthoquinone dyes.

22. An optical storage medium according to claim 21 wherein said guest-host mixtures comprise arylazo, poly (arylazo) and stilbene dyes.

23. An optical storage medium according to claim 20 wherein said guest-host mixtures comprise nematic liquid crystals.

24. An optical storage medium according to claim 23 wherein said nematic liquid crystals are selected from the group 4-cyano-4'-alkylbiphenyls and 4-alkyl-(4'-cyanophenyl)cyclohexanes.

25. An optical storage medium according to claim 1 wherein said anisotropically absorbing molecules or moieties are the arylazo, di(arylazo), tri(arylazo), tetra(arylazo), penta(arylazo), anthraquinone, mericyanine, methine, 2-phenylazothiazole, 2-phenylazobenzthiazole, stilbene, 1,4-bis(2-phenylethenyl)benzene, 4,4'-bis(arylazo)stilbenes, perylene and 4,8-diamino-1,5-napthoquinone dyes.

26. An optical storage medium according to claim 25 wherein said anisotropically absorbing molecules or moieties are arylazo, poly(arylazo) and stilbene dichroic dyes.

27. An optical storage medium according to claim 26 wherein anisotropically absorbing molecules are selected from the group of diazodiamine 1,4,4'-diaminostilbene 2, and monoazodiamine 3.

28. An optical storage medium according to claim 1 wherein said optical alignment layer(s) comprises a polyimide polymer.

29. An optical storage medium according to claim 28 wherein said anisotropically absorbing molecules or moieties are nonbonded solutes in said polyimide polymer.

30. An optical storage medium according to claim 28 wherein said anisotropically absorbing molecules or moieties are covalently bonded to said polyimide polymer.

31. An optical storage medium according to claim 1, wherein two or more of said optical alignment layers have an absorbance maxima between 150 and 1600 nm and differ by more than 10 nm.

32. An optical storage medium according to claim 31, wherein said absorbance maxima differ by more than 50 nm.

33. An optical storage medium according to claim 1, wherein two or more of said optical alignment layers have an absorbance maxima between 150 and 800 nm and differ by more than 10 nm.

34. An optical storage medium according to claim 33, wherein said absorbance maxima differ by more than 50 nm.

35. An optical storage medium according to claim 1, wherein two or more of said optical alignment layers have an absorbance maxima between 150 and 400 nm and differ by more than 10 nm.

36. An optical storage medium according to claim 35, wherein said absorbance maxima differ by more than 50 nm.

37. An optical storage medium according to claim 1, wherein two or more of said optical alignment layers have an absorbance maxima between 400 and 800 nm and differ by more than 10 nm.

38. An optical storage medium according to claim 37, wherein said absorbance maxima differ by more than 50 nm.

39. An optical storage medium according to claim 1, wherein said alignment states are a mixture of states selected from the group consisting of twist, birefringent and combination alignment states.

40. An optical storage medium according to claim 1, further comprising:
    a means of spacing said substrates, and
    a means of sealing said substrates to make a cell.

41. An optical storage medium according to claim 1 which is a compact disc with read only capability.

42. An optical storage medium according to claim 17 which is a compact disc with read only capability.

43. An optical storage medium according to claim 1 which is a compact disc with write once—read many times capability.

44. An optical storage medium according to claim 1 which is an erasable compact disc with write/rewrite capability.

45. An optical storage medium according to claim 20 which is an erasable compact disc with write/rewrite capability.

46. An optical storage medium according to claim 1 which stores photographic images.

47. An optical storage medium according to claim 46 which has wide viewing angle.

48. An optical storage medium according to claim 46 wherein the photographic images can be read as positive or negative images.

49. An optical storage medium according to claim 1 or 20 that is an optical storage display.

50. An optical storage medium according to claim 49 wherein said optical storage display has wide viewing angle.

51. An optical storage medium according to claim 1 wherein said substrates have patterned electrodes on one or both surfaces of one or more said pairs of facing surfaces.

* * * * *